(12) United States Patent
Ceravolo et al.

(10) Patent No.: US 11,831,778 B2
(45) Date of Patent: Nov. 28, 2023

(54) ZKMFA: ZERO-KNOWLEDGE BASED MULTI-FACTOR AUTHENTICATION SYSTEM

(71) Applicant: Redcom Laboratories, Inc., Victor, NY (US)

(72) Inventors: Sal Ceravolo, Canandaigua, NY (US); Peizhao Hu, West Henrietta, NY (US); Collin Sweeney, Fairport, NY (US); Alexis Holler, Webster, NY (US)

(73) Assignee: Redcom Laboratories, Inc., Victor, NY (US)

( * ) Notice: Subject to any disclaimer, the term of this patent is extended or adjusted under 35 U.S.C. 154(b) by 0 days.

(21) Appl. No.: 17/722,474

(22) Filed: Apr. 18, 2022

(65) Prior Publication Data

US 2022/0239488 A1  Jul. 28, 2022

Related U.S. Application Data

(63) Continuation of application No. 17/494,064, filed on Oct. 5, 2021.
(Continued)

(51) Int. Cl.
*H04L 9/32* (2006.01)
*H04L 9/08* (2006.01)

(52) U.S. Cl.
CPC .......... *H04L 9/3218* (2013.01); *H04L 9/0861* (2013.01)

(58) Field of Classification Search
CPC .................................................... H04L 9/3218
See application file for complete search history.

(56) References Cited

U.S. PATENT DOCUMENTS 7,050,584 B1    5/2006  Hoffman et al.
9,503,448 B2   11/2016  Logue
(Continued)

FOREIGN PATENT DOCUMENTS

CN    110889696 A    3/2020
WO    WO-0048064 A1 *  8/2000  ............. G06F 21/34
(Continued)

OTHER PUBLICATIONS

PCT International Search Report and Written Opinion of the International Search Authority, or the Declaration, dated Jan. 17, 2022, PCT/US2021/053483, pp. 1-11.
(Continued)

*Primary Examiner* — Darshan I Dhruv
(74) *Attorney, Agent, or Firm* — NK Patent Law

(57) ABSTRACT

An authentication method of a prover by a verifier includes: performing at least once, an enrollment process by an enrollment center computer; and subsequent to performing the enrollment process, performing an on demand authentication process including: receiving at a verifier computer from the prover, a prover authentication request sent from the prover computer device which includes the prover identity and a preferred ZKP protocol identifier; looking up a prover's public key in the database via the identity; the verifier sending a selected ZKP protocol identifier to the prover computer device; commencing a round of authentication by receiving a commitment generated according to the selected ZKP protocol; and repeating the step of commencing a round of authentication until the verifier computer accepts or rejects the prover's identity. A zkMFA method of authentication and an authentication system for authenticating a prover by a verifier are also described.

4 Claims, 31 Drawing Sheets

An diagram showing how device key fragments are generated from credentials and ZKP private keys

Related U.S. Application Data

(60) Provisional application No. 63/232,762, filed on Aug. 13, 2021, provisional application No. 63/087,509, filed on Oct. 5, 2020.

(56) References Cited

U.S. PATENT DOCUMENTS

| | | | |
|---|---|---|---|
| 9,667,628 B2 | 5/2017 | Johnson et al. | |
| 9,948,622 B2 | 4/2018 | Logue | |
| 10,164,955 B1 | 12/2018 | Halcrow et al. | |
| 10,305,914 B1 | 5/2019 | Brin et al. | |
| 10,320,843 B1 | 6/2019 | Dobrek et al. | |
| 10,326,590 B2 | 6/2019 | Smith et al. | |
| 10,326,740 B2 | 6/2019 | Resch et al. | |
| 10,372,930 B2 | 8/2019 | Sharma et al. | |
| 10,491,390 B2 | 11/2019 | Gurkan et al. | |
| 10,516,527 B1* | 12/2019 | Machani | H04L 9/0625 |
| 10,530,777 B2 | 1/2020 | Costa | |
| 10,554,628 B2 | 2/2020 | Hoss et al. | |
| 11,063,944 B2 | 7/2021 | Avetisov et al. | |
| 11,140,171 B1* | 10/2021 | Friedman | H04L 9/0861 |
| 2002/0062451 A1* | 5/2002 | Scheidt | H04L 9/0825 726/7 |
| 2002/0067832 A1* | 6/2002 | Jablon | H04L 9/0844 713/182 |
| 2005/0235148 A1* | 10/2005 | Scheidt | G06Q 20/3829 713/168 |
| 2006/0184787 A1* | 8/2006 | Sandhu | H04L 9/3271 713/155 |
| 2009/0210722 A1* | 8/2009 | Russo | H04L 9/0866 713/189 |
| 2013/0031372 A1* | 1/2013 | Oltmans | H04L 9/3236 713/189 |
| 2014/0278972 A1* | 9/2014 | Yonebahashi | G06Q 30/0255 705/14.53 |
| 2017/0118175 A1 | 4/2017 | Ristock et al. | |
| 2017/0286717 A1* | 10/2017 | Khi | G06F 21/6245 |
| 2018/0210742 A1 | 7/2018 | Costa | |
| 2018/0211034 A1 | 7/2018 | Costa | |
| 2018/0211035 A1 | 7/2018 | Costa | |
| 2018/0212770 A1 | 7/2018 | Costa | |
| 2018/0212939 A1 | 7/2018 | Costa | |
| 2018/0212966 A1 | 7/2018 | Costa | |
| 2018/0212971 A1 | 7/2018 | Costa | |
| 2018/0270065 A1* | 9/2018 | Brown | H04L 9/0861 |
| 2019/0042764 A1 | 2/2019 | Durham et al. | |
| 2019/0104196 A1 | 4/2019 | Li et al. | |
| 2019/0205898 A1 | 7/2019 | Greco et al. | |
| 2019/0251553 A1 | 8/2019 | Ma et al. | |
| 2019/0279206 A1 | 9/2019 | Song et al. | |
| 2019/0280880 A1 | 9/2019 | Zhang et al. | |
| 2019/0312863 A1* | 10/2019 | Chow | H04L 9/0643 |
| 2020/0014537 A1 | 1/2020 | Ortiz et al. | |
| 2020/0014691 A1 | 1/2020 | Ortiz et al. | |
| 2020/0057664 A1 | 2/2020 | Durham et al. | |
| 2020/0059361 A1 | 2/2020 | Konda et al. | |
| 2020/0059362 A1 | 2/2020 | Brody et al. | |
| 2020/0059364 A1 | 2/2020 | Konda et al. | |
| 2020/0112545 A1 | 4/2020 | Smith et al. | |
| 2020/0127833 A1 | 4/2020 | Konda et al. | |
| 2020/0127834 A1 | 4/2020 | Westland et al. | |
| 2020/0127835 A1* | 4/2020 | Fletcher | H04L 9/085 |
| 2020/0202029 A1* | 6/2020 | Tadayon | H04W 12/02 |
| 2020/0287901 A1* | 9/2020 | Avetisov | H04L 9/088 |
| 2021/0167958 A1* | 6/2021 | Soriente | H04L 9/3218 |

FOREIGN PATENT DOCUMENTS

| | | | |
|---|---|---|---|
| WO | WO-2019006446 A1 | 1/2019 | |
| WO | WO-2019086553 A1 | 5/2019 | |
| WO | WO-2020139937 A1 * | 7/2020 | H04L 9/0825 |

OTHER PUBLICATIONS

Feige Uriel et al: "Zero-knowledge proofs of identity", Journal of Cryptology, [Online] vol. 1, No. 2, Jun. 1, 1988 (Jun. 1, 1988), pp. 77-94, XP055876489, New York ISSN: 0933-2790, DOI: 10.1007/BF02351717; Retrieved from the Internet: URL:https://link.springer.com/content/pdf/10.1007/BF02351717.pdf> [retrieved on Jan. 5, 2022] abstract Section 3.

Schnorr, C.P., "Efficient Signature Generation by Smart Cards," 1991, Fachbereich Mathematik/Informatik (22 pgs).

Feige, U., et al., "Zero Knowledge Proofs of Identity," 1987, Department of Applied Mathematics (pp. 210-217).

Guillou, L. C., et al., "A 'Paradoxical' Indentity-Based Signature Scheme Resulting from Zero-Knowledge," 1990, Advances in Cryptology (pp. 216-231).

Menezes, A., et al., "Handbook of Applied Cryptography," 1997, CRC Press, Inc., Chp. 10 (pp. 385-424).

* cited by examiner

Illustration of a single FFS round

Generic protocol classes.

Illustration of the masking process on the answer foo

Mask(S, H : hash of I, L : span of each mask, $n$ : number of masks, $lh$ : bit length of hash)
for $i = 1..n$ do
  for $j = 1..L_i$ do
    $h \leftarrow H(\text{piece}(H_{i,j}, \frac{lh}{L_i}))$
    $R_{i+j-1} \leftarrow S_{i+j-1} - h$
  endfor
endfor
return R Masking algorithm

FIG.4

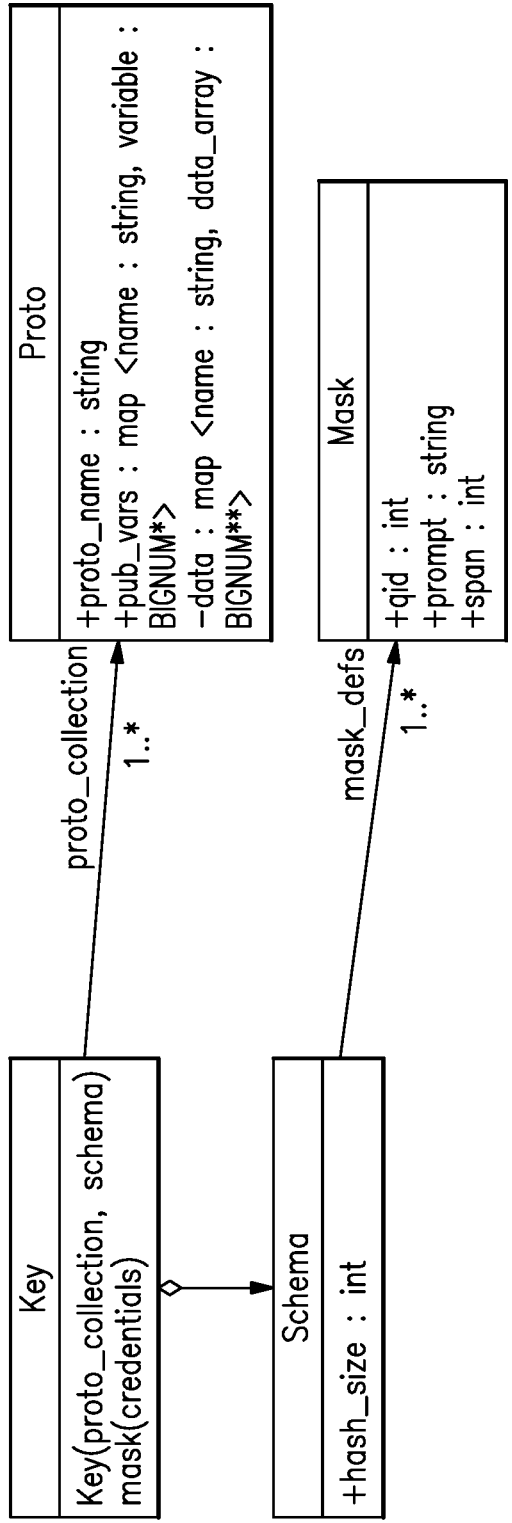
FIG.5 Classes associated with the internal representation of keys.
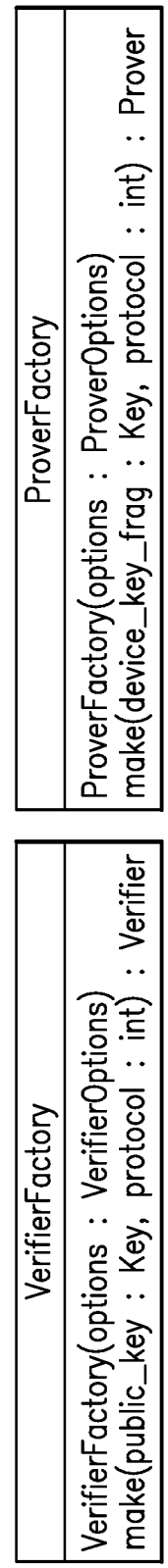
FIG.6 VerifierFactory and ProverFactory functionality Registrar and associated classes The overall zkMFA system architecture Illustration of the enrollment phase with indirect enrollment Illustration of one round during the authentication phase when using FFS Illustration of a abstract round of ZKP FIG.12 Illustration of the flow of data within the zkMFA system for each phase Illustration of abstract enrollment with Attestation

| Phase | Keys Obtained by each Endpoint per Phase | |
|---|---|---|
| | Prover | Verifier |
| Enrollment | D device key<br>Z: private long-term fragment | V: public key<br>U: public long-term fragment |
| Authentication | R: witnesses<br>(aka private short-term fragments) | X: commitments<br>(aka public short-term fragments) |
| Attestation Setup | A: private session key | G: public session key |

Table of Keys per endpoint at the conclusion of each phase

FIG.14

Levels of Access Revocation

| Level | Delete Key | Result | Recovery |
|---|---|---|---|
| 1 | G: public session key | User's active session terminates | User must re-authenticate |
| 2 | U: public long-term fragment | User cannot perform attestation and must authenticate for each resource | User must re-enroll |
| 3 | V: public key | User can no longer access resources | User must re-enroll |

FIG.16

Table describing levels of access revocation and recovery techniques for each user and device combination Attestation with FFS

| | PRIVATE | PUBLIC |
|---|---|---|
| Enrollment (Long-Term Fragment) | $Z = \{z_i \mid z_i \leftarrow \mathbb{Z}_N\}^*$<br><br>*value must also be invertible (i.e., coprime) mod N* | $U = \{u_i \equiv \pm(z_i^2)^{-1} \pmod{N} \mid z_i \in Z\}$ |
| Authentication (Short-Term Fragment) | $R = \{r_i \mid r_i \leftarrow \mathbb{Z}_N\}^*$<br><br>*value must also be invertible (i.e., coprime) mod N* | $X = \{x_i \equiv \pm(r_i^2) \pmod{N} \mid r_i \in R\}$ |
| Attestation (Session Key) | $\square = z_i \times ((r_1)^{-1} \times (r_2)^{-1} \times \ldots \times (r_s)^{-1})$<br>$A = \{a_i \equiv \square \pmod{N} \mid z_i \in Z, r_i \in R\}$ | $\triangle = u_i \times (x_1 \times x_2 \times \ldots \times x_s)$<br>$G = \{g_i \equiv \triangle \pmod{N} \mid u_i \in U, x_i \in X\}$ |

FIG. 17

The equations showing how attestation keys/fragments are generated with FFS

```
{
  "schema": {
    "size": 4,
    "mask_defs": [
      {"qid": 0, "text": "Lorem ipsum dolor sit amet?", "span": 5},
      {"qid": 0, "text": "Non arcu varius quam quisque id?", "span": 5},
      {"qid": 0, "text": "Leo in sed elementum tempus egestas?", "span": 5},
      {"qid": 1, "text": "", "span": 5}
    ]
  },
  "protos": [
    {
      "proto_name": "ffs",
      "mod_n": "123ABC...",
      "data": ["DEF456...", "789ACF...", "..."],
      "long-term": ["GHI789...", "012JKL...", "..."],
      "session": ["MN0846...", "QWE123...", "..."]
    },
    {
      "proto_name": "schnorr",
      "pub_vars": [{"mod_p": "098ZXY"},
                   {"mod_q": "GEH234..."},
                   {"beta": "IJK567..."}],
      "data": ["LMN890...", "OPQ246...", "..."],
      "long-term": ["TYU876...", "TRE0987...", "..."]
    }
  ]
}
```

Serialization of a prover Key in JSON

FIG.18

```
{
  "schema": {
    "size": 4,
    "mask_defs": [
      {"qid": 0, "span": 5},
      {"qid": 0, "span": 5},
      {"qid": 0, "span": 5},
      {"qid": 1, "span": 5}
    ]
  },
  "protos": [
    {
      "proto_name": "ffs",
      "pub_vars": [{"mod_n": "123ABC..."}],
      "data": ["DEF456...", "789ACF...", "..."],
      "long-term": ["GHI789...", "012JKL...", "..."],
      "session": ["MN0846...", "QWE123...", "..."]
    },
    {
      "proto_name": "schnorr",
      "pub_vars": [{"mod_p": "098ZXY"},
                   {"mod_q": "GEH234..."},
                   {"beta": "IJK567..."}],
      "data": ["LMN890...", "OPQ246...", "..."],
      "long-term": ["TYU876...", "TRE0987...", "..."]
    }
  ]
}
```

Serialization of a verifier Key in JSON

FIG.19

Illustration of the enrollment phase with direct enrollment

FIG.21 Illustration of a challenge guessing attack for a single FFS round

A flowchart of enrollment and authentication process

FIG.23 An diagram showing authentication with the abstract ZKP protocol at a high-level An diagram showing how device key fragments are generated from credentials and ZKP private keys An example of how a credential is selected from the bits of the challenge for a single round of ZKP A flowchart of the attestation setup process during the enrollment and authentication phases

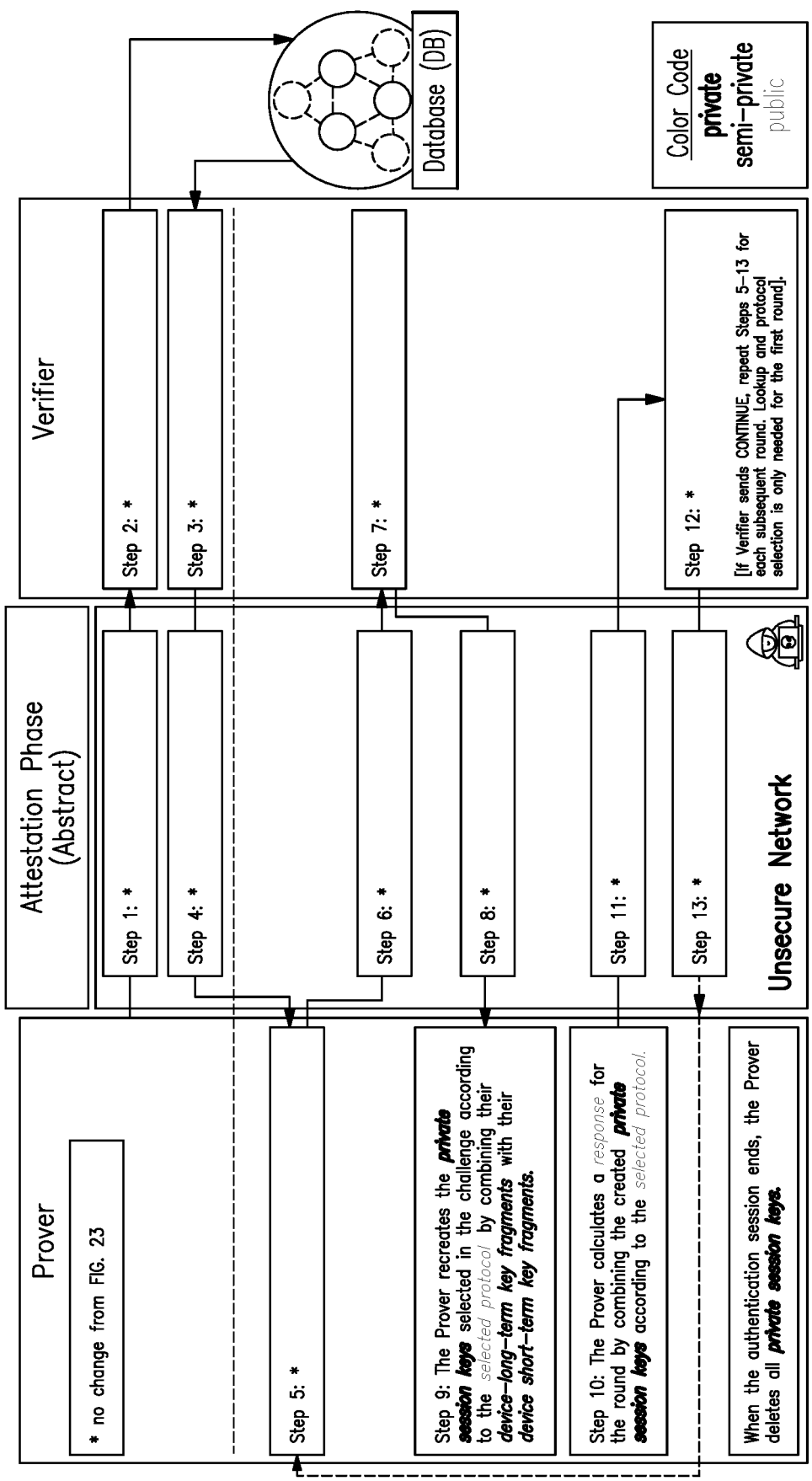
FIG.27 An diagram showing attestation with the abstract ZKP protocol at a high-level

FIG. 28

$$S = \{S_1, S_2, \ldots, S_l\} \mid S_i \leftarrow \$Z_N \wedge (\exists S_i^{-1})[S_i \bullet S_i^{-1}] \equiv 1 \pmod{N} \quad (1)$$
$$V = \{\pm(S_i^2)^{-1} \pmod{N} \mid S_i \in S\} \quad (2)$$

Equations 1 and 2 describe how private and public keys are generated with FFS

FIG. 29

$$r \leftarrow \$Z_N \wedge (\exists r^{-1})[r \bullet r^{-1}] \equiv 1 \pmod{N} \quad (3)$$
$$x \equiv r^2 \pmod{N} \quad (4)$$

Equations 3 and 4 that describe how the prover generates a witness and commitment for each round of FFS

FIG. 30

$$c = \{b_1, \ldots, b_2, b_l\} \mid b_i \leftarrow \$\{0, 1\} \quad (5)$$

Equation 5 describes how the challenges is generated for each round of FFS

FIG.31

$$w \equiv r S_1^{b1} \ldots S_l^{bl} \pmod{N} \tag{6}$$

Equation 6 describes how the prover generates their response for each round of FFS

FIG.32

$$y \equiv v_1^{b1} \ldots v_l^{bl} \pmod{N} \tag{7}$$

$$J \in \{0, 1\} \leftarrow x \stackrel{?}{\equiv} w^2 y \pmod{N} \tag{8}$$

Equation 8 describes how the verifier evaluates the prover's response for each round of FFS using Equation 7

FIG.33

$$w^2 y \equiv (r S_1^{b1} \ldots S_l^{bl})^2 (v_1^{b1} \ldots v_l^{bl}) \pmod{N} \tag{9}$$

$$\equiv r^2 (S_1^2)^{b1} (v_1) \ldots (S_l^2)^{b1} (v_l)^{bl} \tag{10}$$

$$\equiv r^2 (v_1 S_1^2)^{b1} \ldots (v_l S_l^2)^{bl} \tag{11}$$

$$\equiv r^2 ((\pm S_1^2)^{-1})(S_1^2))^{b1} \ldots ((\pm S_l^2)^{-1})(S_l^2))^{bl} \tag{12}$$

$$\equiv \pm r^2 \tag{13}$$

$$\equiv x \pmod{N} \tag{14}$$

Equations 9–14 show how Equation 8 evaluates to true if the prover correctly adds their secrets to their response in Equation 6

$$\bar{x} \equiv xv_1^{b_1}\ldots v_l^{b_l} \pmod{N} \quad (15)$$
$$\bar{w} \equiv r \pmod{N} \quad (16)$$

Equations 15 and 16 describe the potential substitutions a malicious prover could make in a challenge guessing attack

FIG.34

$$\bar{x} \equiv \bar{w}^2 y \pmod{N} \quad (17)$$
$$\equiv (r)^2 y \pmod{N} \quad (18)$$
$$\equiv xy \pmod{N} \quad (19)$$
$$\equiv xv_1^{b_1}\ldots v_l^{b_l} \pmod{N} \quad (20)$$

Equations 17–20 show how a malicious prover could pass Equation 8 if they provide Equations 15 and 16

FIG.35

$$D = \{S_i - H_i \mid S_i \in S, H_i \in H\} \quad (21)$$

Equation 21 describes how the device key fragment is generated from the sets of ZKP private keys S and masked personal information H

FIG.36

$$S = \{D_i - H_i \mid D_i \in D, H_i \in H\} \quad (22)$$

Equation 22 describes how the ZKP private key can be recreated from the sets of device key fragments and masked personal information H

FIG.37

$$Z = \{Z_1, Z_2, \ldots, Z_l\} \mid Z_i \leftarrow \$Z_N \wedge (\exists Z_i^{-1})[Z_i \cdot Z_i^{-1}] \equiv 1 \pmod{N}] \quad (23)$$
$$Z = \{\pm(Z_i^2)^{-1} \pmod{N} \mid Z_i \in Z\} \quad (24)$$

Equations 23 and 24 describe how device and public long term key fragments are generated with FFS

FIG. 38

$$A = \{Z_i \cdot (R_1^{-1} \cdot R_2^{-1} \cdot \ldots \cdot R_m^{-1}) \pmod{N} \mid Z_i \in Z; R_i \in R\} \quad (25)$$
$$G = \{U_i \cdot (X_1 \cdot X_2 \cdot \ldots \cdot X_m) \pmod{N} \mid U_i \in U; X_i \in X\} \quad (26)$$

Equations 25 and 26 describe how private and public session keys are generated with FFS Attestation

FIG. 39

$$G_i = \pm(A_i^2)^{-1} \pmod{N} \quad (27)$$
$$= \pm((Z_i \cdot (R_1^{-1} \cdot R_2^{-1} \cdot \ldots \cdot R_m^{-1}))^2)^{-1} \pmod{N} \quad (28)$$
$$= \pm(Z_i^2 \cdot (R_1^2)^{-1} \cdot (R_2^2)^{-1} \cdot \ldots \cdot (R_m^2)^{-1})^{-1} \pmod{N} \quad (29)$$
$$= \pm(Z_i^2)^{-1} \cdot (R_1^2) \cdot (R_2^2) \cdot \ldots \cdot (R_m^2) \pmod{N} \quad (30)$$
$$= U_i \cdot X_1 \cdot X_2 \cdot \ldots \cdot X_m \pmod{N} \quad (31)$$

Equations 27-31 show how Equation 8 evaluates to true when session keys are substituted for ZKP keys in the protocol

FIG.40

$$\frac{pq-(p-1)(q-1)}{pq} = \frac{pq-pq+p+q-1}{pq} = \frac{1}{q} + \frac{1}{p} - \frac{1}{pq} \quad (32)$$

Equation 32 quantifies the negligible fraction of elements that are not co-prime to N

FIG.41

ZKMFA: ZERO-KNOWLEDGE BASED MULTI-FACTOR AUTHENTICATION SYSTEM

CROSS-REFERENCE TO RELATED APPLICATIONS

This application is a continuation of co-pending U.S. patent application Ser. No. 17/494,064, ZERO-KNOWLEDGE BASED MULTI-FACTOR AUTHENTICATION SYSTEM, filed Oct. 5, 2021, which claims priority to and the benefit of co-pending U.S. provisional patent application Ser. No. 63/232,762, zkMFA: ZERO-KNOWLEDGE BASED MULTI-FACTOR AUTHENTICATION SYSTEM, filed Aug. 13, 2021, and U.S. provisional patent application Ser. No. 63/087,509, zkMFA: ZERO-KNOWLEDGE BASED MULTI-FACTOR AUTHENTICATION SYSTEM, filed Oct. 5, 2020, now expired, all of which applications are incorporated herein by reference in their entirety.

FIELD OF THE APPLICATION

The application relates to zero knowledge proof systems, particularly zero knowledge proof systems including cryptographic methods for information security.

BACKGROUND

Traditional password-based authentication, while nearly ubiquitous today, is flawed in several important ways. Perhaps most importantly, the security of a password depends almost entirely on its length and how randomly its component characters are chosen, leading to a situation where the strongest passwords are also generally the hardest to remember. As a consequence, many people use short, insecure passwords, or re-use a single password across multiple accounts. Passwords are also typically stored in a single, centralized database, albeit in encrypted format, which means that password-based authentication systems generally have a single point of failure or compromise. This problem is significantly worsened if users re-use passwords across multiple accounts: in the worst case, where a user has a single password for all their accounts, one data breach could give attackers access to all accounts. The most robust solution for end users is to use a password manager, but this only mitigates the problem for individual users.

In addition, reliance on traditional authentication systems implicitly relies on users to keep their client device security up to date, exercise cyber hygiene with respect to downloading potentially malicious software, keep their devices securely under their control, and not share their passwords with anyone. Historically, relying on users in these ways has failed dramatically, putting systems at risk

SUMMARY

An authentication method of a prover by a verifier includes: performing at least once, an enrollment process by an enrollment center computer including: enrolling a prover via credentials and identity provided by the prover by use of a prover computer device; associating by computer, the credentials with prompts and generating public variables, private keys and public keys by a generation protocol per ZKP protocol; combining the credentials and the private keys to generate at least one device key share; deleting said private keys from the enrollment center; sending the public variables and at least one device key share to the prover computer device; storing the public variables, public keys, and prover identity associated with the prover computer device in a database; subsequent to performing the enrollment process, performing an on demand authentication process including: receiving at a verifier computer from the prover, a prover authentication request sent from the prover computer device which includes the prover identity and a preferred ZKP protocol identifier; looking up a prover's public key in the database via the identity; the verifier sending a selected ZKP protocol identifier to the prover computer device; commencing a round of authentication by receiving a commitment generated according to the selected ZKP protocol; and repeating the step of commencing a round of authentication until the verifier computer accepts or rejects the prover's identity.

The step of performing at least once, the enrollment process, can include performing at least once, a direct enrollment process.

The step of performing at least once, the enrollment process, can include performing at least once, an indirect enrollment process.

The verifier sending the ZKP protocol identifier to the prover computer device can include selecting the ZKP protocol identifier from a prover's public information.

The step of sending the ZKP protocol identifier can include sending a FFS ZKP protocol identifier to the prover computer device.

The step of performing an on demand authentication process can include performing a zkMFA authentication process.

The step of performing at least once, an enrollment process, can further include, if attestation is to be allowed, generating at least one device long-term key fragment and a corresponding public long-term key fragment by a generation protocol per ZKP protocol.

The step of performing an on demand authentication process can further include, as a prover, if allowing attestation and identity is accepted, store all witnesses for that authentication session in a local cache as a device short-term key fragment.

The step of performing an on demand authentication process can further include, as a verifier, when protocol completes if allowing attestation and identity is accepted, storing all commitments for that authentication session in the database as a public short-term key fragment associated with the prover's identity.

The method can further include subsequent to an on demand authentication process, an attestation process that proves if the prover has previously authenticated by verifying a prover's knowledge of at least one private proof element generated during a round of authentication.

The method when performing attestation, can include generating ZKP private session keys by combining device short-term key fragments and device long-term key fragments. The method when performing attestation, can include generating a response by use of ZKP private session keys.

The method when combining device long-term key fragments and device short-term key fragments, can include combining in such a way that an output has a pseudorandom distribution and a resulting private session key that can be substituted for ZKP private keys in the attestation protocol.

A zkMFA method of authentication of a prover by a verifier includes: computing on a prover computer device, a public commitment from a randomly generated private witness; generating by the verifier computer, a random challenge; sending the random challenge from the verifier computer to the prover; prompting the prover via the prover computer device for credentials selected by the challenge; accepting a response as a combination of ZKP private keys sent from the prover computer device by the verifier computer as a prover's response for a round; evaluating by the verifier computer, the prover's response for the round, and the verifier computer responding to the prover with either one of: acceptance of identity, rejection of identity, or request for continuation of authentication, as a determination of whether the prover passed the round of authentication, and determining by the verifier computer if there will be subsequent rounds of authentication; and if subsequent rounds of authentication are called for, repeating the steps of computing on the prover computer device, the public commitment to receiving by the verifier computer, the step of receiving by the verifier computer, and the steps from generating by the verifier computer, the random challenge to the step of evaluating by the verifier computer, the prover's response for the round, until the prover's identity is accepted or rejected.

The step of accepting a response as a combination of ZKP private keys sent from the prover computer device by the verifier computer as a prover's response for a round can include: reconstructing on the prover computer device all selected private keys by recombining the prover's associated credentials and device key shares; and calculating by the prover computer device a response from the prover for a round; and receiving by the verifier computer, prover's response for the round.

An authentication system for authenticating a prover by a verifier includes an enrollment center computer configured to be communicatively coupled to a prover computer device. An enrollment process runs on the enrollment center computer, the enrollment process configured to: enroll a prover via credentials and identity provided by the prover by use of the prover computer device; associate by computer, the credentials with prompts and to generate public variables, private keys and public keys by a generation protocol per ZKP protocol; to combine the credentials and the private keys to generate at least one device key share; delete the private keys from the enrollment center; send the public variables and at least one device key share to the prover computer device; store the public variables, public keys, and prover identity associated with the prover computer device in a database; and subsequent to the enrollment process, to perform an on demand authentication process comprising: to receive at a verifier computer from the prover, a prover authentication request sent from the prover computer device which includes the prover identity and a preferred ZKP protocol identifier; to look up a prover's public key in the database via the identity; the verifier to send a selected ZKP protocol identifier to the prover computer device; to commence a round of authentication having received a commitment generated according to the selected ZKP protocol; and to repeat to commence a round of authentication until the verifier computer accepts or rejects the prover's identity.

The foregoing and other aspects, features, and advantages of the application will become more apparent from the following description and from the claims.

BRIEF DESCRIPTION OF THE DRAWINGS

The features of the application can be better understood with reference to the drawings described below, and the claims. These drawings are not necessarily to scale, emphasis is instead placed upon illustrating the principles described herein. In the drawings, like numerals are used to indicate like parts throughout the various views.

FIG. 4 is an exemplary masking algorithm;

FIG. 5 is a drawing illustrating exemplary classes associated with the internal representation of keys;

FIG. 6 is a drawing illustrating exemplary VerifierFactory and ProverFactory hierarchy and functionality;

FIG. 14 is a table that lists new variables generated during each phase per entity;

FIG. 16 is a table listing the various levels of access revocation with Attestation and their recovery methods;

FIG. 17 is a diagram showing exemplary equations useful for generating a long-term fragment, short-term fragment, and session key for attestation with FFS;

FIG. 18 is a listing showing an exemplary Serialization of a prover Key in JSON;

FIG. 19 is a listing showing an exemplary Serialization of a verifier Key in JSON;

FIG. 27 is a diagram showing attestation with the abstract ZKP protocol at a high level;

FIG. 28 shows Equations 1 and 2 that show how private and public keys are generated with FFS;

FIG. 29 shows Equations 3 and 4 that describe how the prover generates a witness and commitment for each round of FFS;

FIG. 30 shows Equation 5 which describes how the challenges are generated for each round of FFS;

FIG. 31 shows Equation 6 which describes how the prover generates their response for each round of FFS;

FIG. 32 shows Equation 8 which describes how the verifier evaluates the prover's response for each round of FFS using Equation 7;

FIG. 33 shows Equations 9-14 which prove that Equation 8 evaluates to true if the prover correctly supplies their private keys in Equation 6;

FIG. 34 shows Equations 15 and 16 which describe the substitutions a malicious prover could make in a challenge guessing attack on FFS;

FIG. 35 shows Equations 17-20 that highlight how a malicious prover could pass Equation 8 if they substitute Equations 15 and 16 for Equations 4 and 6;

FIG. 36 shows Equation 21 which describes how the device key fragments are generated from the sets of ZKP private keys and masked credentials;

FIG. 37 shows Equation 22 which describes how the ZKP private keys can be recreated from the sets of device key fragments and masked credentials;

FIG. 38 shows Equations 23 and 24 which describe how device and public long-term key fragments are generated for FFS;

FIG. 39 shows Equations 25 and 26 which describe how private and public session keys are created for attestation with FFS;

FIG. 40 shows Equations 27-31 which show how Equation 8 evaluates to true when the session keys are substituted for the ZKP keys in the protocol; and FIG. 41 shows Equation 32 which quantifies the negligible fraction of elements that are not co-prime to N.

DETAILED DESCRIPTION

Definitions—Z-Auth Terms and Definitions

Figure 1:
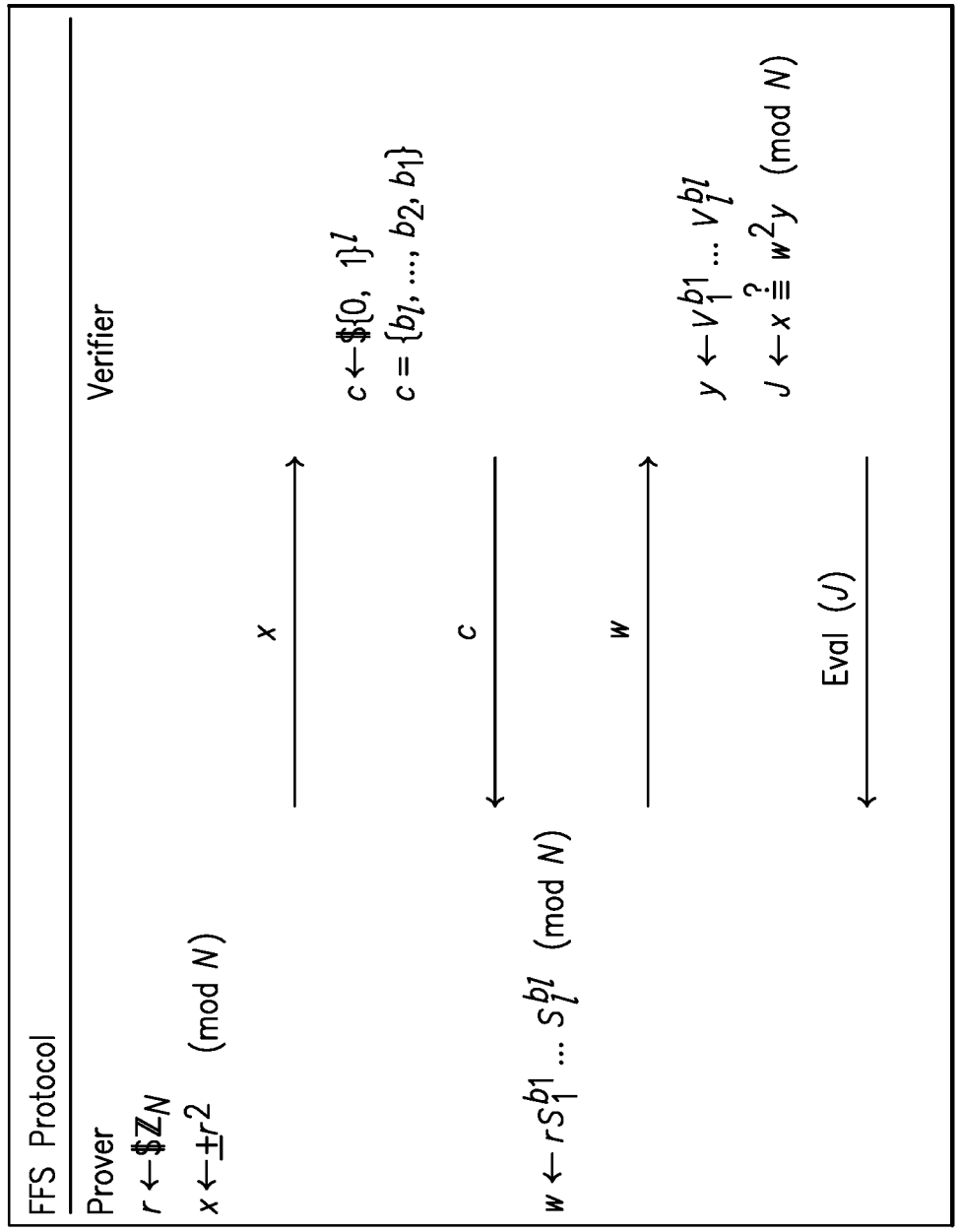
FIG. 1 is a drawing which illustrates a single FFS round.

Abstract—A generalized structure that describes high-level functions and interactions but forgoes implementation details. Abstract structures represent models of functional blocks that can be later implemented by one or more concrete definitions that specialize the high-level functions by defining implementation details.

Secret Sharing Technique—A method by which private or secret information can be split up into multiple parts such that each individual part by itself provides an adversary no statistical advantage in guessing the secret beyond random chance.

Secret Share—One part of a secret generated using a secret sharing technique (hereby referred to as a key fragment or key share within this Application).

Prover—The entity that wants to prove their knowledge or possession of a secret in a zero-knowledge proof.

Verifier—The entity that is verifying the prover's knowledge in a zero-knowledge proof.

Private Variables—Variables only known or possessed by the prover. The disclosure of a single one of these variables would render the protocol insecure.

Semi-Private Variables—Variables that should be only known or possessed by the prover. The disclosure of any of these variables will not inherently compromise the security of the protocol, but may release some otherwise sensitive information that identifies the prover.

Public Variables—Variables that can be known or possessed by all parties, even those not participating in the protocol.

Authentication Session—the time between when the prover generates their first witness and the verifier either accepts or rejects the prover's identity or the prover terminates early Application Session—a session that is managed external to the zkMFA framework using attestation. An application session ranges from the time the verifier accepts the prover's identity until the external application chooses to terminate it.

In the description, other than the bolded paragraph numbers, non-bolded square brackets ("[ ]") refer to the citations listed hereinbelow.

This Description is in 8 parts. Part 1 is an introduction. Part 2 explains the basics of zero-knowledge proofs and introduces our new abstract ZKP protocol utilized by the zkMFA system of the Application which adapts traditional ZKPs to a multi-factor setting. Part 3 outlines the zkMFA framework that utilizes this abstract ZKP protocol. Part 4 describes the required properties of public data storage systems within the zkMFA framework and Part 5 details the added security of combining the aforementioned technologies for authentication purposes. Part 6 describes the overall workflow of the zkMFA system and Part 7 identifies several possible extensions to the zkMFA system including our new zero-knowledge session management scheme. Lastly, Part 8 provides high-level technical details of an exemplary implementation.

Part 1—Introduction

The new zkMFA system of the Application is described in detail hereinbelow. By combining ZKPs with multi-factor authentication, zkMFA provides a solution that is robust for all users without compromising security. Rather than traditional passwords, the more general term "credentials" is used to describe the user's input to the system. Abstracting the user's input in this way provides not only greater usability but also greater flexibility, because these credentials can also take the form of secrets stored on physical objects like smart cards, RFID/NFC tokens, and so on. Within the zkMFA system, the user is authenticated by a combination of their credentials and their device registration data. When the user first enrolls in the system, a unique device registration is generated for each of the user's devices (also referred to as the device key fragment) and is stored on the user's device for additional identification. The manner in which these additional factors (i.e., credentials and device registrations) are incorporated (detailed in Part 3) represents a significant improvement over existing zero-knowledge systems, as it renders impersonation infeasible. Even if an attacker is in possession of a user's device, they could not authenticate without knowing or otherwise possessing the user's credentials and vice versa.

As an added benefit, associating each device with a unique registration and the user with the same set of credentials allows for unique identification of both a user and their device, without compromising usability. The ability to identify specific devices, and configure the number and type of credentials, affords system administrators additional parameters with which to restrict or relax access to specific resources. Certain resources may require credentials of varying number and security to be accessed, allowing for the creation of so-called 'frictionless' systems wherein less secure resources can be accessed with less effort by performing fewer authenticating transactions without compromising the security of the system as a whole (and more secure resources can be accessed by performing a greater number of authentication transactions). For example, a password may be all that is required to access a less secure system while a more secure system may require multiple factors such as a password and a CAC (it is up to an implementor to determine what constitutes a less secure credential versus a more secure credential).

The user's sensitive credentials are protected in this system by ZKPs that allow the user to be authenticated without sending sensitive information over the network (for more details see Part 2). The user's credentials are further protected at rest as well as in transit by our new secret sharing technique (defined in Part 3.2) which uses the user's credentials to derive a device key fragment (which acts as a secret share) from the traditional ZKP private key. This prevents the need to store the sensitive private key on the user's device directly. Instead, the device stores the device key fragment which, if accessed, gives an adversary no statistical advantage in guessing the ZKP private key. In our system, an attacker could not gain access without also knowing (or otherwise possessing) the user's credentials in addition to the device key fragment (and vice versa).

Part 2—Defining an Abstract Zero-Knowledge Protocol that Utilizes Zero-Knowledge Proofs of Identity for Multi-Factor Authentication A ZKP is a proof between two parties wherein one party (the prover) demonstrates to another (the verifier) that they possess some information without revealing anything about their (the prover's) information except that they possess it. Most of our zkMFA framework is built upon employing our new abstract zero-knowledge protocol as described herein. This protocol was derived from the Feige-Fiat-Shamir (FFS) protocol as described in [1] and its extensions (two well-known examples of this are the Guillou-Quisquater (GQ) [4] and Schnorr protocols [2]), which have essentially the same structure as FFS but have different strategies for establishing knowledge and base their security on different computationally hard 'one-way' problems.

Although the exemplary reference implementation described hereinbelow depicts only FFS, support could easily be added for any other protocol (both interactive and non-interactive) that shares the same basic three-part structure. Many different protocols conforming to this definition exist, some more generic with respect to the information in question than others. For the zkMFA system of the Application, an abstract protocol includes the following basic elements, which constitutes a zero-knowledge proof of identity (See FIG. 11 for a visual representation):

an entity called the verifier which authenticates others by posting a set of randomly selected challenges and verifying the corresponding answers supplied by the prover;

an entity called the prover which tries to authenticate itself by responding to the set of challenges posted by the verifier;

a set of one or more public variables;

a set of S comprising the user's private key and the set V derived from S comprising the public key, where l is the number of elements in each of the sets of keys; and a random private value r, called the witness, and corresponding public value x (derived from r), called the commitment, a random public value c, called the challenge with a bit-length of k, and a judgement J that determines if the authentication was successful, all of which are unique to a single authentication round.

The protocol is defined in this way, because many existing zero-knowledge protocols (e.g., Feige-Fiat-Shamir, GQ, Schnorr, and variants thereof) make use of these elements in substantially the same manner, differing primarily in how each value is computed and bounded. This abstract protocol can thus accommodate these existing, concrete, protocols with minimal modification. As an exemplary proof of concept, we have implemented the Feige-Fiat-Shamir (FFS) protocol based on the system described in [1].

2.1 Implementation of Feige Fiat Shamir (FFS) within the Abstract Protocol

The specifics of FFS serve to illustrate how these elements, when combined, can be used to prove one's identity (i.e., possession of the ZKP private key) without revealing anything about the credentials used to prove that identity. For FFS, the set of ZKP private keys S is randomly sampled for the prover by an Enrollment Center (EC) from Z/NZ (the set of elements co-prime to N) as shown in Eq. 1, and the corresponding public keys V have the form shown in Eq. 2 which imposes the additional restriction that the values of $S_i$ in S must be invertible mod N. Here, the modulus N is stored as a ZKP public variable where N must be a Blum integer, i.e., a semiprime pq such that $p \equiv q \equiv 3 \pmod 4$, as defined in [1].

Authentication with FFS involves one or more rounds. Assuming the prover and verifier have agreed on the number of keys l, the prover can provide S associated with V as produced by the Enrollment Center according to the constraints in [0063], and the verifier has access to V, the protocol proceeds one round at a time as follows:

the prover generates a witness r by randomly sampling a value from Z/NZ (the set of elements co-prime to 1V) (See Eq. 3);

Next, the prover derives their commitment x from r as shown in Eq. 4 and sends x to the verifier;

After the verifier receives the prover's commitment, the verifier generates a challenge c by randomly sampling a value in $Z_{2^k}$ (represented by a bit vector of length k where k=1 for FFS; See Eq. 5) and sends the challenge to the prover;

The prover calculates their response w by combining their secrets in Eq. 6;

Finally, the verifier evaluates the prover's response by calculating y from the bits in the challenge, as shown in Eq. 7, and then substituting y to evaluate Eq. 8. The resulting judgement J is a single bit derived from the evaluation that determines if the equation is true or not.

The verifier evaluates the judgement to determine its next steps. If Eq. 8 evaluates to true, then this round of authentication succeeds and the verifier can decide whether to accept the prover's identity or continue with up to a maximum of l rounds as previously agreed. If the equation evaluates to false, then the prover has failed authentication and is rejected. FIG. 1 is a visual illustration of a single FFS round. By generating the commitment, witness, and response in this way, no information about the prover's private key is revealed other than the prover knows (or is in possession of) it. Moreover, even if an eavesdropper had access to the elements exchanged, this would reveal no useful information. For example, to recover r from x, an eavesdropper would have to compute the square root of x (modulo N) which is equivalent to integer factorization of x since N is composite by definition, which in turn can be made intractable by choosing sufficiently large values (we use numbers of at least 1024 bits throughout as suggested by [3]).

The final judgement value J indicates whether or not the selected values of S (that is, those $S_i$ such that $b_i=1$) are correct. This correctness is based on the relationship between V and S: Eqs. 9-14 describe why Eq. 8 evaluates to true if the prover correctly supplies their private keys.

Figure 21:
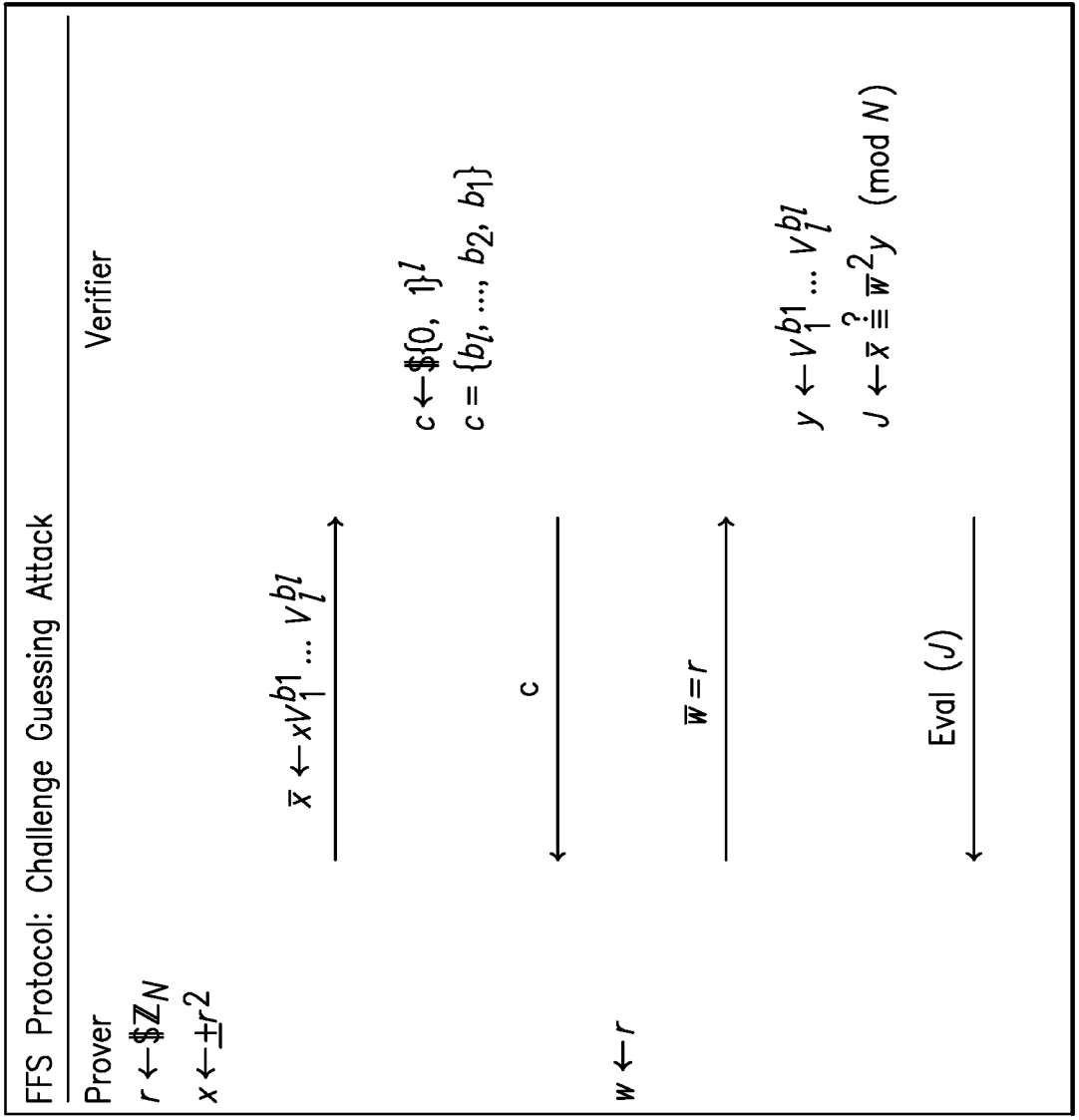
FIG. 21 is an illustration of how a challenge guessing attack would function during a single round of FFS.

Note that with a probability of $2^{-k}$ it would be possible for a malicious prover to guess the challenge. If an adversary can accurately predict the challenge prior to sending their commitment, then they can pass the evaluation by straying from the protocol and calculating their values differently. Instead of sending the commitment x in their first message, a malicious prover can send x-bar, as shown in Eq. 15, as their commitment. The verifier cannot detect that the prover has strayed from the protocol, so the round continues as normal and the verifier selects their challenge and sends it to the prover. The malicious prover, instead of responding with the appropriate response w (See Eq. 6), proceeds by sending w-bar (See Eq. 16). By modifying their messages in this way, a malicious prover can pass the evaluation equation only if they have correctly guessed every bit of the challenge (See FIG. 21). Eqs. 17-20 show why this evaluation succeeds where x-bar and w-bar are used to distinguish between the verifier's interpretation of x and w and the prover actual calculation of x and w. Thus the security of a single round is based on the probability of guessing the challenge which is $2^{-k}$.

As a result, a single round does not strictly guarantee that the prover's identity is authentic, so the evaluation function on J, called the result, determines whether the authentication should continue with more rounds, or stop by either accepting or rejecting the prover's identity claim. If J=0, Eval(J) always results in a rejection of the identity, since this proves that the prover is not in possession of the secret S values. If J=1, Eval(J) must determine whether to accept the identity or continue with more rounds. With each additional round of the protocol, the verifier becomes more confident in the prover's identity because the probability of forgery (the probability of the prover repeatedly guessing the correct challenge) exponentially decreases where the total probability over m rounds with a challenge size of k is $2^{-mk}$.

Note that we have modified the original FFS protocol as outlined in [1] to allow the private witnesses from each round to be used in subsequent attestation. The prover, instead of sampling it's witness from $Z_N$, now samples the witness from the slightly smaller set of values that are co-prime to N (Z/NZ). Note that this modification does not break the original proof of zero-knowledge for FFS since a malicious verifier still cannot distinguish between the protocols with non-negligible probability and, in fact, the two protocol variations are statistically indistinguishable. This is because with overwhelming probability, a random element in $Z_N$ is also invertible. In particular, the number of invertible elements mod N is quantified by Euler's Totient function: phi(N)=(p−1)(q−1). Hence, the fraction of elements that are not invertible (as shown in Eq. 32) is negligible in the size of N assuming p and q have approximately the same size. Therefore, the probability that a malicious verifier can distinguish between the two protocols is negligible.

Part 3—the zkMFA Framework

The zkMFA framework builds on the abstract zero-knowledge protocol described in Part 2, with additional elements to facilitate multi-factor authentication and private key protection. In particular, a third entity, the Enrollment Center (EC), is introduced which behaves similar to a Certificate Authority (CA) in that the EC is trusted to issue ZKP keys to specific users and their devices. Specifically, the EC manages user enrollment, generates keys, calculates protocol-specific public values, and associates these values with a unique prover identity. When authenticating users and their devices, the prover can be thought of as a combination of both the user and their device, this is the exemplary configuration we will be assuming for this Application but note that this is only one potential configuration. If the prover is made up of the user and their device, the prover's unique identity becomes a concatenation of the user's unique identifier and the device's unique identifier. The EC can use this identity to store the prover's public authenticating data in the database to be accessed by external verifiers. The EC can be accessed over a network connection or directly at a special (trusted) interface called an enrollment terminal. The enrollment terminal provides an additional layer of security when enrolling new users into the system because their private information can be entered directly into the system rather than sent over a network.

3.1—Support for Multi-Factor Authentication

To incorporate multi-factor information sources, a generic concept of prover 'credentials' is now described as any static data that can be hashed in some way. This can encompass most traditional and non-traditional sources of multi-factor information—what you have, what you know, where you are, etc. The most straightforward type of credential is text-based such as answers to security questions, e.g., "What is the title and artist of your favorite song?", "What was your favorite elementary school teacher's name?", or "In what city or town did your mother and father meet?". These associated prover credentials can be either the user's credentials, their device's credentials, or a combination of both. In this Application the term 'credentials' refers to the combination of all sources of prover credentials unless otherwise specified. To differentiate various types of credentials, the zkMFA system of the Application associates the prover's credentials, denoted I, with a set of prompts, denoted Q. These prompts could contain the question text or some other identifier that distinguishes this credential for the prover. Note that for user credentials, each $Q_i$ need not always be shown to the user but could also be used to tag information, such as data stored on an RFID card, or location information (i.e., geo-positioning data or wireless network information).

3.2 Improving Security and Usability Through Masks and Key Fragments

Figure 24:
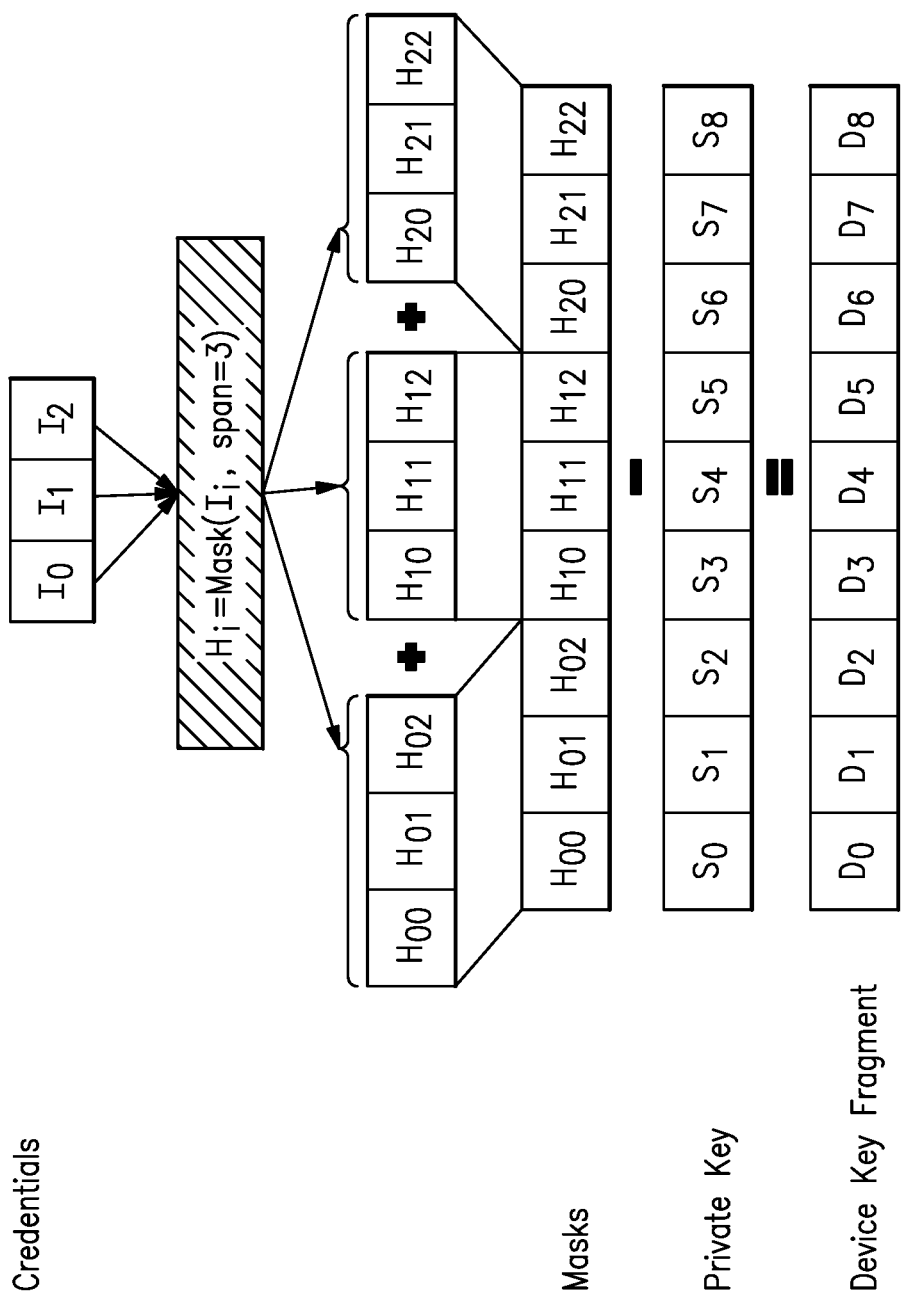
FIG. 24 is a diagram showing how device key fragments are generated from user credentials and ZKP private keys.

To reach higher security levels in our abstract ZKP protocol, the user must provide several credentials at authentication time. Increasing the number of user inputs requires increased interaction between the user and the system, and slows the overall pace of network operations, putting more strain on the system's users, administrators, and architecture. To minimize user inputs and maintain security, user credentials are first expanded via the masking algorithm described in FIG. 4 which takes a single user credential and splits it into several "masks". The masking algorithm not only expands the user's credential but also hides its true value through repeated hashing (See Part 3.3). The resulting set of masks (H), is the set of outputs of the masking algorithm after it is executed on all user credentials. To incorporate prover credentials into their private key generated in Part 2, a new set of values (D) is derived by "masking" the ZKP private key with the masked credentials, H as shown in Eq. 21 (See FIG. 24). The resulting set D is referred to as a device key fragment (DKF) that is useless on its own, but allows users to reconstruct S by adding their personal information back in. This prevents the user's private key from being stored anywhere in the system. Instead, it is dynamically recreated at authentication time by prompting the user for their credentials, repeating the masking process, and re-combining the masks with their key fragments as shown in Eq. 22. All re-created private keys are then automatically deleted once authentication ends. The set of DKFs is stored on the user's device and acts as a unique device registration which requires the user to know their personal information and be using a registered device to authenticate successfully. The use of DKFs significantly improves the security of the overall system by protecting against key stealing attacks since accessing the DKFs on the prover device alone does not give an adversary the ability to authenticate successfully.

3.3 The Masking Process

The masking generation process expands the user's credentials from an input set of size n to a larger set of size l by passing each credential $I_i$ through the masking algorithm to produce a new set $H_i$. The total set of masks H is the result of concatenating each output $H_i$ for $1<=i<=n$.

The masking algorithm on a single credential involves hashing it once to produce a value whose length is dependent on the size of the hash function (e.g., for SHA-256 the output is 256 bits). That value is then divided into L equal parts where L is the size of the output set (also referred to as the span). Each of those L parts are then hashed again for the second time with the same hash function to produce L values of size equal to the hash output. These L values make up the set of masks $H_i$ for credential $I_i$ (See FIG. 3 for a depiction of the masking process on the credential "foo"). By repeating the masking process on n credentials, we can achieve a set of masks H of length l where $l=n*L$.

Expanding credentials in this way not only affords greater usability, but also improves security by distributing a non-uniform user input uniformly amongst the output bits of the hash function. This allows user credentials to range across the entire range of potential values.

3.4—New User Registration/Enrollment —

The EC, which manages registration of users and devices, supports two methods of registration: direct registration and indirect registration. Both methods have the same inputs and outputs, but differ primarily in how sensitive data is transferred. Indirect registration is more secure but also more involved, whereas direct registration is simpler but requires sensitive information to be sent to the EC over some communication channel. Thus, direct registration is only as secure as the underlying channel is secure.

Figure 20:
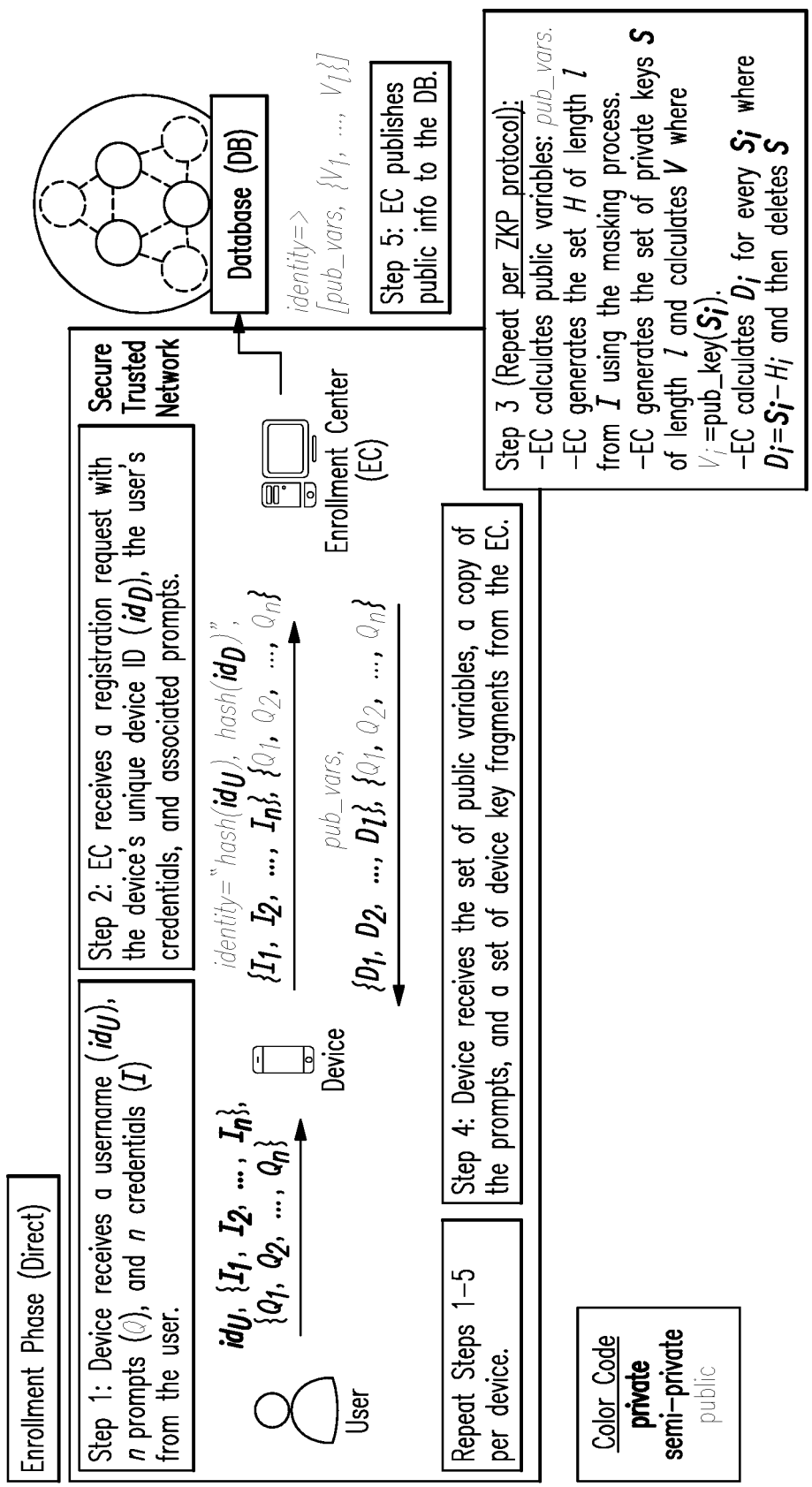
FIG. 20 is a drawing illustrating the enrollment phase using direct enrollment.

Direct registration (See FIG. 20) involves sending all enrollment information (identity="hash($id_U$),hash($id_D$)", I, Q) to the EC in a single payload (Steps 1-2). If the user is allowed to enroll, then the EC will generate one or more device key fragments $D_i$ (Step 3) and send the entire set D to the user's device along with a copy of the prompts Q (Step 4) and store their corresponding public key V in the database for later retrieval, indexed by the unique identity provided (Step 5).

For indirect registration (see FIG. 9), the user's sensitive credentials must be entered on a trusted computer (the enrollment terminal), likely on the local network of an organization. After the user enters their username ($id_U$) and the values for both I and Q (Step 1), the EC saves the values of $id_U$, I, and Q to a local cache for a set amount of time (determined by an administrator) and generates two pieces of information used to retrieve these cached values: an enrollment session ID sent via some out-of-band format (e.g., a QR code, email link, temporary password, etc.), and an additional pairing code shown directly to the user (See Step 2). Registration then continues on the user's device where the user must enter both values, the pairing code via direct input and the session ID via an out-of-band method, and their username (Step 3). The device then sends the entered session ID, pairing code, and a unique identifier for the device $id_D$ to the EC (Step 4). The EC uses this information to complete registration by generating and storing the new public key in the database (Step 7), and calculating the device key fragments $D_i$ as described in Part 3.2 (Step 5). Rather than sending the value of S back to the newly registered device, the EC sends back the set of DKFs (D) and a copy of the prompts Q (Step 6) as with direct registration. In this way, no information about the private key (S) or the user's private information (I) is ever leaked, even over insecure channels, provided the EC itself is a trusted device. Once a user is registered with a particular device, they can use that device for authentication.

Figure 25:
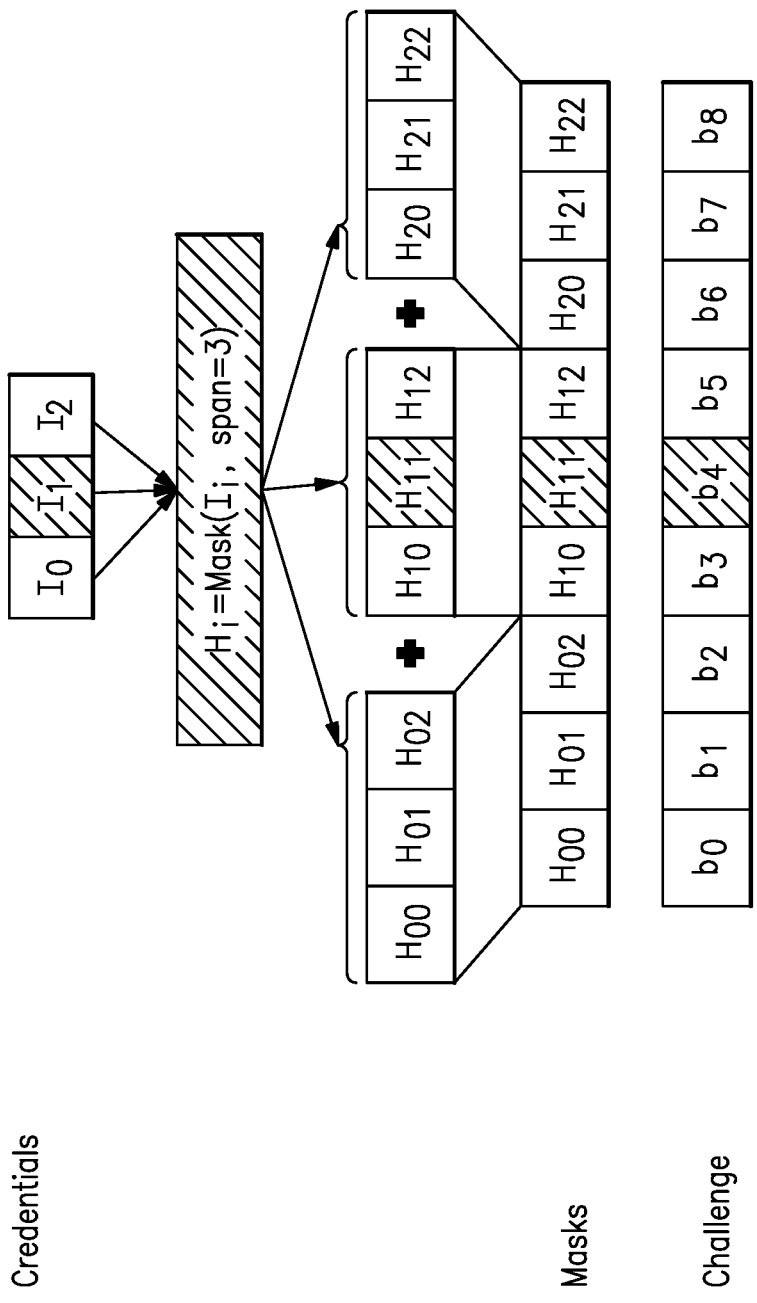
FIG. 25 is an example diagram showing how credentials are selected from each bit of the challenge for a single round of ZKP

During authentication, the user is prompted with a subset of the prompts Q provided at enrollment. The selection of prompts the prover must respond to in a given round is determined by the verifier via the challenge at authentication time where the pair ($Q_i$, $I_i$) is selected if any of the associated mask from the set $H_i$=mask($I_i$) is selected where $H_i$ is the set masks associated with credential $I_i$ (See FIG. 25). After the challenge is given, the prover enters their corresponding credentials for the selected prompts to execute the proof of their identity.

Part 4—Public Authentication Data Storage

The zkMFA system and method of the Application requires a database to store public data for authenticating users within the framework. Specifically, the system needs to store the public variables and public keys for each ZKP protocol so they can be accessed by a verifier to execute the ZKP protocol in Part 2 as well as any other public data required by any extensions of this framework. The public data described therein is persistent until changed, and its authenticity must be proved through other means when the user first enrolls in the system. Thus, the zkMFA public database can be any type of storage system that has the following properties (for example, an immutable distributed ledger (IDL) such as a Hyperledger, or PKI using X.509 certificates).

4.1 Required Properties for Public Authentication Data Storage

Although the zkMFA public data can be read by anyone, certain protections must be put in place to ensure that data is not illegally added or modified. If an adversary were able to write to the database, then they could either add their own data or overwrite another's data to pass the ZKP and gain access without needing to break the protocol. For this reason access to the database must be strongly protected and regulated where changes can only be made by trusted devices (i.e., the Enrollment Center computer). For this reason we require the EC to be located within a secure area as to provide additional external security. Not only should the EC be validated as a trusted device, but by extension the EC must also be able to validate users and devices that are using the EC to enroll in the zkMFA system. If enrolling indirectly via an Enrollment Terminal, it is strongly recommended that there be additional physical security to validate new user identities. Similarly for indirect enrollment via a communication channel, it is strongly recommended that there be additional protections in place to validate the legitimacy of the remote user and their device as well as protect their sensitive data from observation and modification during transit.

Part 5—Security

Extending from the security formalization shown in [1], the protocol of the zkMFA system according to the Application introduces an extra layer of security with the concept of masks and key fragments. The basic protocol ensures that no prover (malicious or otherwise) can impersonate a user without knowing their secret with non-negligible probability. Under our extended protocol, no value of S is ever transmitted over a network connection, even secure ones. Rather, for direct registration the user's personal information, I, is transmitted, and a device key fragment, D, is returned. The value of D allows for any user who knows the value of I to reconstruct S easily, but is useless on its own to complete the proof. As such, direct registration is secure against man-in-the-middle attacks only insofar as the underlying channel is secure against such attacks. Security can be increased even further by requiring indirect registration, where even the value of I is only entered at a secure physical location, and the only values transmitted over a network connection are the hashes of $id_U$, $id_D$, the device key fragment D, and the pairing and session codes generated by the EC. This kind of registration thus sidesteps even the possibility of a man-in-the-middle attack altogether, since no secret value is ever transmitted over any network channel, secure or otherwise, and thus even an attacker with complete access to all communication between the prover and the verifier will be unable to impersonate the prover or derive any information about S.

Part 6 System Workflow

Figure 8:
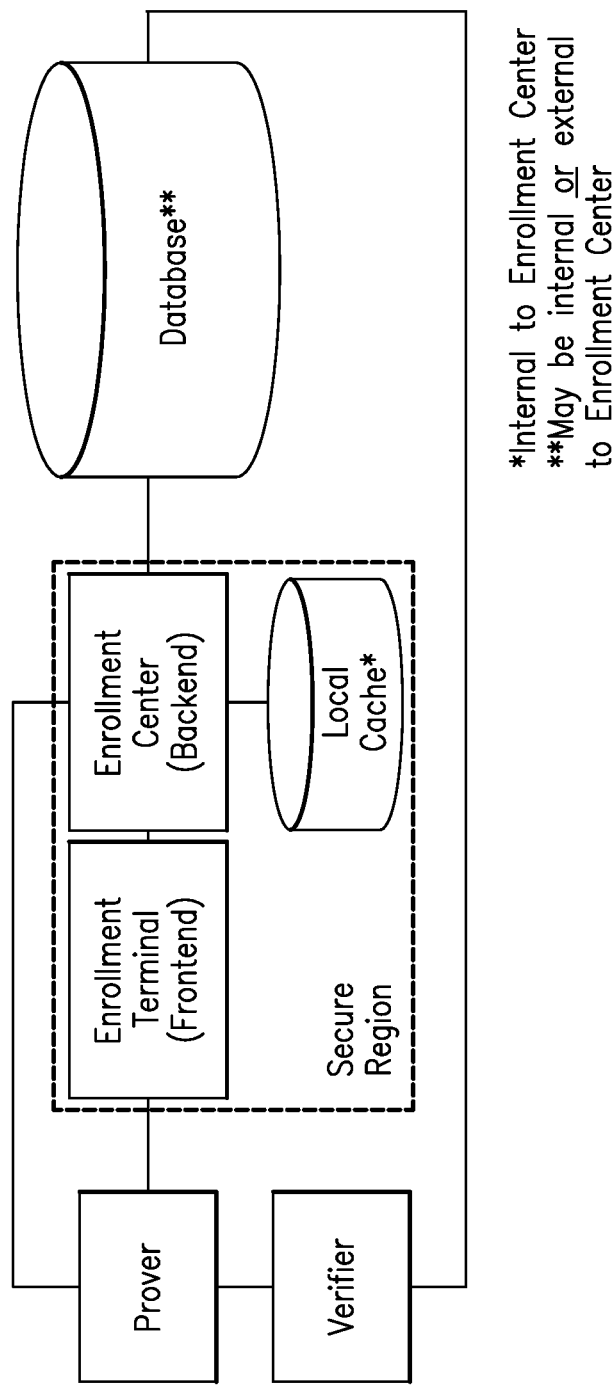
FIG. 8 is a drawing showing a block diagram of an overall zkMFA system exemplary architecture.

FIG. 8 is a drawing showing a block diagram of an overall zkMFA system exemplary architecture. As shown in FIG. 8, the zkMFA system consists of some number of clients (prover or verifier), an enrollment infrastructure (the Enrollment Center with a frontend Enrollment Terminal) which should be set up in a secure region, and a database which stores public parameters at enrollment for lookup during the authentication phase. These clients accept incoming users which have been previously registered through the frontend Enrollment Terminal or over a communication channel with the EC. As a part of the enrollment process, public parameters generated for the ZKP authentication are published to the database.

The operation of the system as a whole can be divided into three separate phases: enrollment, authentication and, optionally, attestation (as described in Part 7.3 below). The enrollment phase involves registration of users and devices, which may take place at a central location called the EC via an Enrollment Terminal (for indirect registration) or from the user's device via a communication channel (for direct registration). Both should be within a secure environment since enrollment involves sending sensitive user information to the EC. Once enrolled, the authentication phase involves a registered user and their registered device acting as a prover and authenticating with a verifier through our abstract ZKP protocol. After the prover has authenticated, the additional attestation phase can optionally maintain an authenticated user's active session until it is terminated.

Throughout this part, suppose a user Alice would like to register with the $id_U$ "alice" on a device with an $id_D$ "alice-mobile". In a real system, the hash of "alice" would be used as the $id_U$ and the hash of "alice-mobile" as the $id_D$; hashing these values prevents any eavesdropper from recovering user-specific information from a zkMFA interaction, such as the identity of the user authenticating and on which device authentication is taking place. However, for simplicity we will refer to these values directly as the $id_U$ and $id_D$.

Part 6.1—Enrollment Phase

As previously mentioned, enrollment can be accomplished in one of two ways: by direct registration, simpler but less secure, or by indirect registration, more involved but much more secure. For most use cases, indirect registration should be preferred, but direct registration can be beneficial in certain niche scenarios where rapid enrollment is required (e.g., the EC can act as an enrollment endpoint for multiple users). Direct registration might also be used in situations where bandwidth is very limited, because it has a lower communication overhead than indirect registration, if the client is willing to sacrifice some security or make up for security by other means.

Part 6.1.1—Direct Registration

The process for direct registration is the same even if the user has already registered one or more devices: the user sends the following information: their identity "hash("alice"),hash("alice-mobile")", their selected prompts Q and corresponding credentials I, to the EC which generates a device key fragment D and stores their public key V for later access by outside parties. In this example, suppose Alice wishes to directly register with her text-based credentials "foo", "bar", and "baz". Internally, the EC would first need to generate a private key specific to the chosen protocol(s) (e.g., Eq. 1, etc.). Then Alice's credentials would be added to the new private key by using the masking algorithm from Part 3.2, which accepts the credentials I and the private key S and extracts the set of device key fragments D (See FIG. 4). Within the masking algorithm, the values of I are hashed to achieve uniformity of representation; using a hashed representation allows for the values of I to range over anything that can be represented in binary form, of any length. Conveniently, the hash output also has a uniform length which can be easily extended to cover all bits of the numbers in the key. Separately, the user's public key must also be generated from the associated private key by evaluating the result of each corresponding protocol-specific trapdoor function (e.g., Eq. 2, etc.).

Part 6.1.2—Indirect Registration

Figure 9:
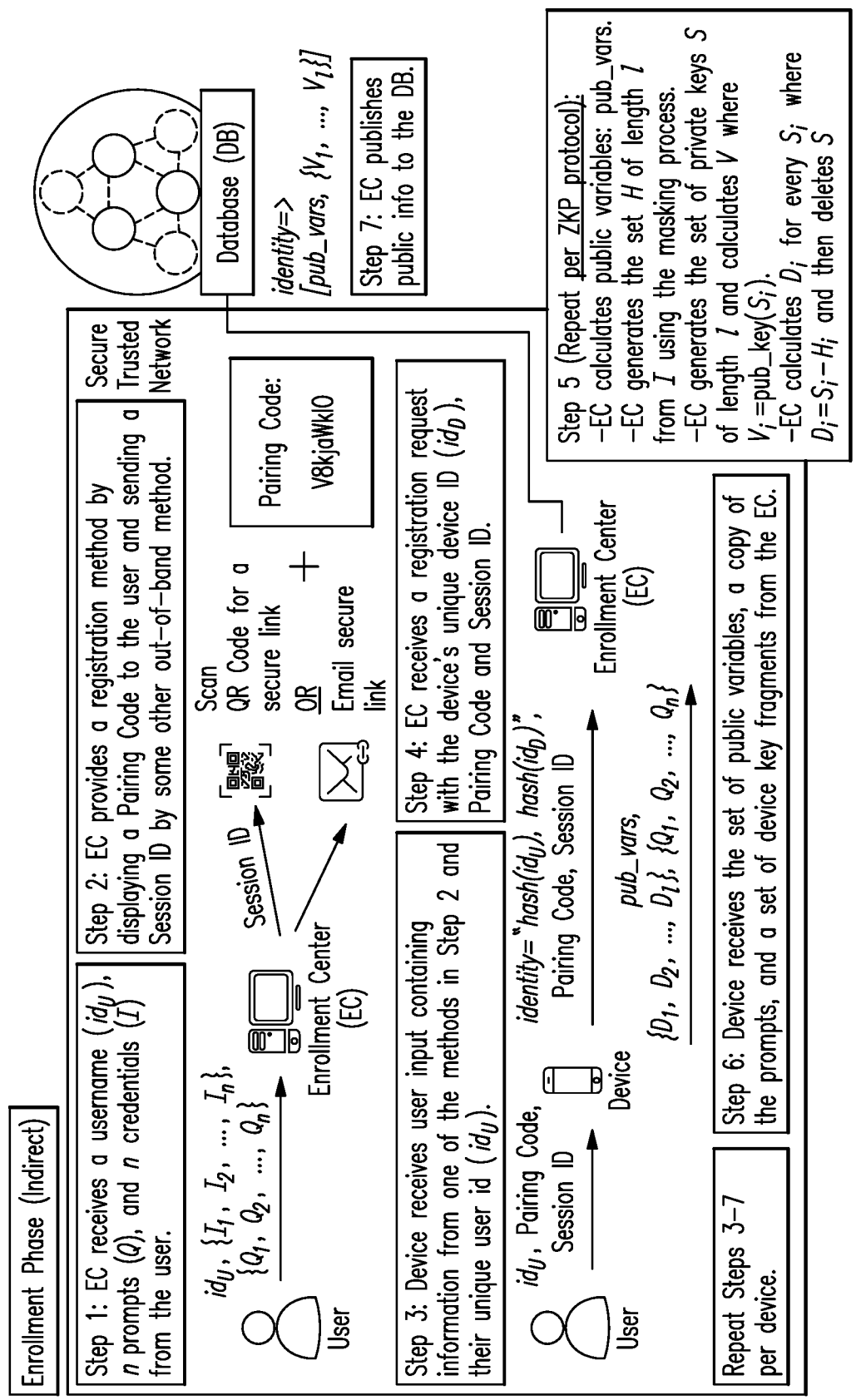
FIG. 9 is a drawing illustrating the enrollment phase using indirect enrollment.
Figure 10:
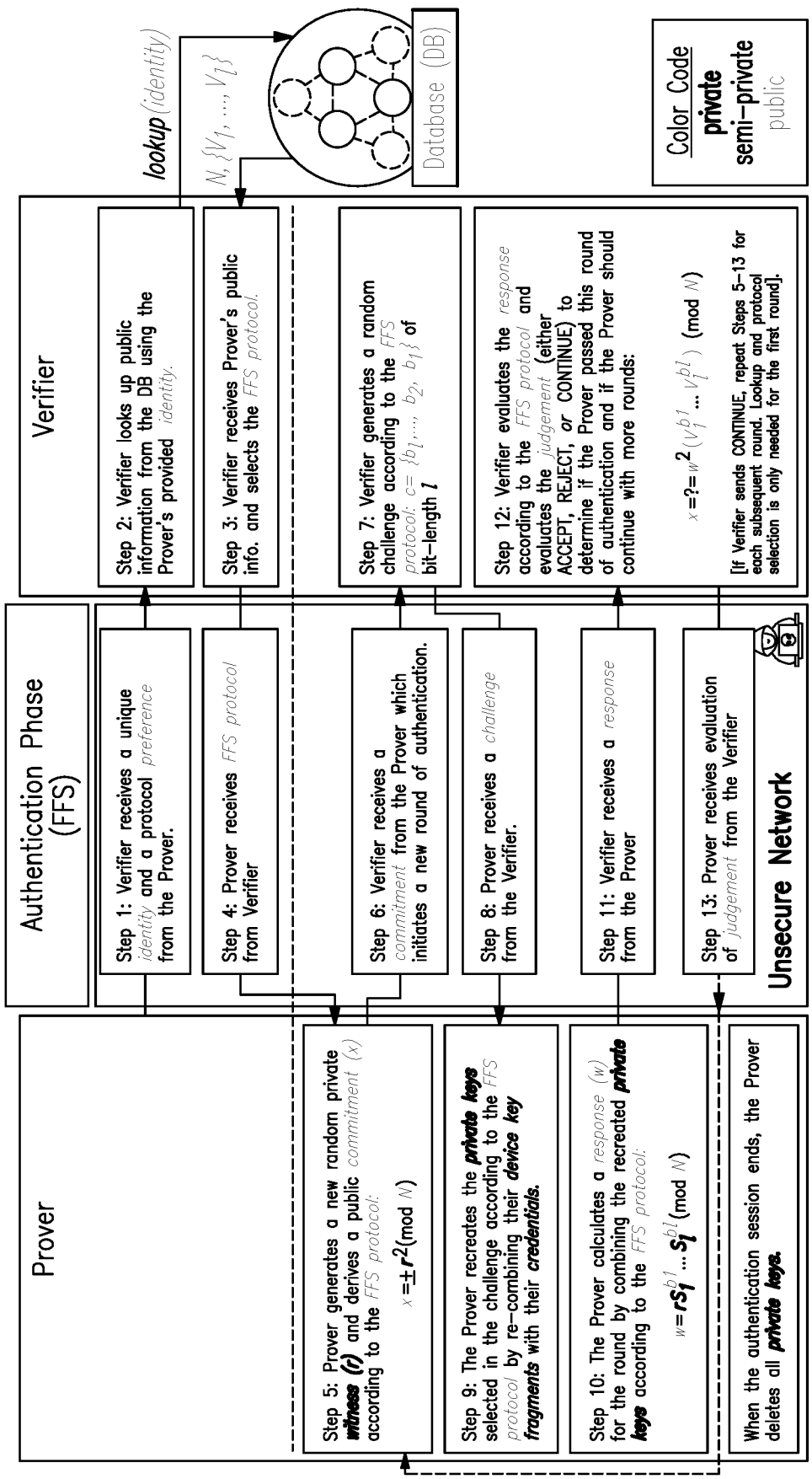
FIG. 10 is a drawing illustrating the authentication phase when using FFS.

FIG. 9 is a drawing illustrating the enrollment phase using indirect registration. The user begins by entering their desired $id_U$ at a secure enrollment terminal, "alice" in this case. Then, their n prompts are selected, comprising Q, and they respond with n credentials which constitutes their set of personal information I, and submit these values as shown in Step 1 to the EC. Suppose, for example, that Alice is registering with indirect registration but with the same answers as Part 6.1.1 above. Alice (if not otherwise pre-selected by an administrator) would enter her prompts and then provide the corresponding credentials: "foo", "bar", and "baz". The enrollment terminal will communicate a pairing code and session ID in some manner (e.g., a QR code, email link, etc.) as shown in Step 2. We use these two values (the pairing code and session ID) to balance usability and security: the session ID is the longer value, which is transmitted via an out-of-band method, e.g. a QR code or email link such that the user does not have to enter this value directly, while the pairing code is shorter because the user is required to enter it directly on to their device, this provides a strong guarantee that whomever initiated the enrollment on the secure enrollment terminal is the same person who is now initiating a pairing session from a new device.

Enrollment then continues on the user's device, where the user can use an out-of-band method to begin device registration. The prover device will then prompt the user for their pairing code and send it, alongside the session ID (received via the out-of-band method) and the device's unique $id_D$, to the EC. The EC then computes S, V, and D as described in Part 3.3. The EC returns D and Q to the newly registered device which stores these values in some type of local secure storage (e.g., Intel SGX, Android Keystore, etc.) and publishes V to the database.

6.2 Authentication Phase —

Figure 23:
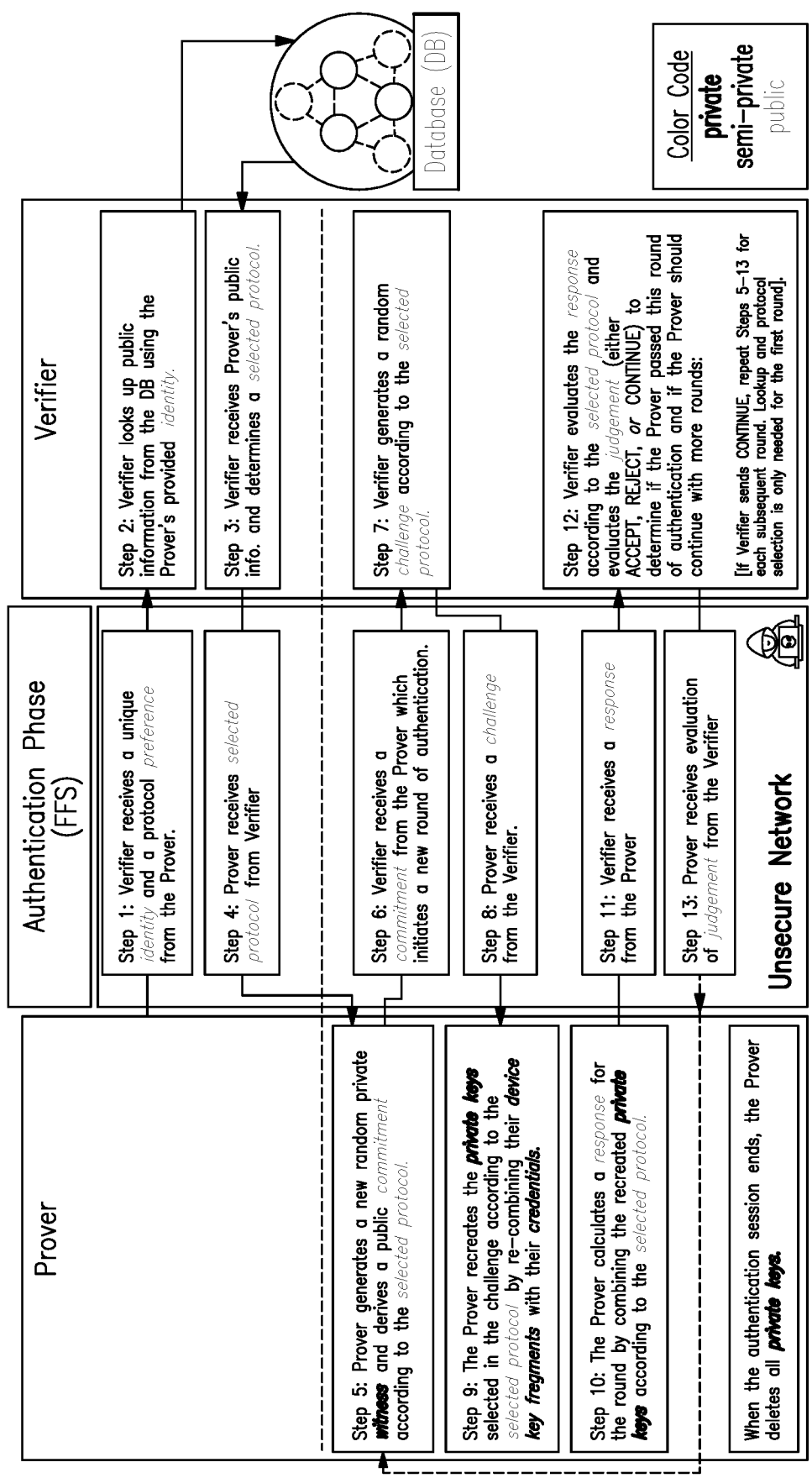
FIG. 23 is a diagram showing authentication with the abstract ZKP protocol at a high-level.

FIG. 23 is a drawing illustrating an abstract authentication phase at a high-level. When a user has registered with at least one device and wishes to authenticate with said registered device, the workflow proceeds largely as previously discussed in Part 2. In the following example, the prover in FIG. 23 is a combination of the user and their device, but this may not always be the case. It is assumed that the prover has already enrolled with the EC, knows its unique identity, and has previously stored its device key fragments D, set of prompts Q, and ZKP public variables. To initiate authentication, the user provides their $id_U$ which is then combined by the prover device with the $id_D$ to generate the prover's unique identity: "hash($id_U$),hash($id_D$)". In the following example, suppose Alice is authenticating; she provides her $id_U$ and her device adds its unique identifier and sends the verifier the combined user and device identity and optionally a protocol preference. This protocol preference may be used to signal an operating environment to the verifier where certain protocols may be more beneficial than others. Next, the verifier uses the prover's identity to look up the prover's public information in the database and determines the selected protocol. This may take into consideration the prover's protocol preference or ignore it based on the verifier's configuration. Once the prover receives the verifier's protocol selection, it internally generates a witness r and then derives the corresponding commitment x (See Step 5). The prover then starts the authentication session by sending its commitment to the verifier (See Step 6). The verifier responds by generating its challenge vector c and sends it back to the prover (Steps 7-8).

Next, the prover interprets the challenge vector as defined by the ZKP protocol and identifies the verifier's selected prompts. Once these prompts are identified, the device then requires the user to respond to each prompt by requesting the corresponding user credential(s). If the user has already responded to the same prompt in a previous round, the user is not prompted again within the same authentication session. Instead, previous responses are cached internally and automatically included in the set of user credentials if repeat prompts are given (which is possible with a truly random challenge). All cached credentials are later automatically deleted once authentication ends either by successful completion, rejection or early termination.

The user credentials (cached or read from an I/O device) are combined with the device key fragments to recreate the selected ZKP private keys for this round (see Step 9). The prover can then calculate w from the ZKP private keys according to the selected protocol as shown and as described in Part 2 and sends it to the verifier, which validates it (see Steps 10-12). After the evaluation, the verifier responds with instructions to either 'continue', 'accept', or 'reject' (see Step 13). If the response is 'continue', the prover restarts at Step 5 and more rounds are performed with new prompts; otherwise, authentication is complete and the prover's identity is either accepted or rejected.

Figure 22:
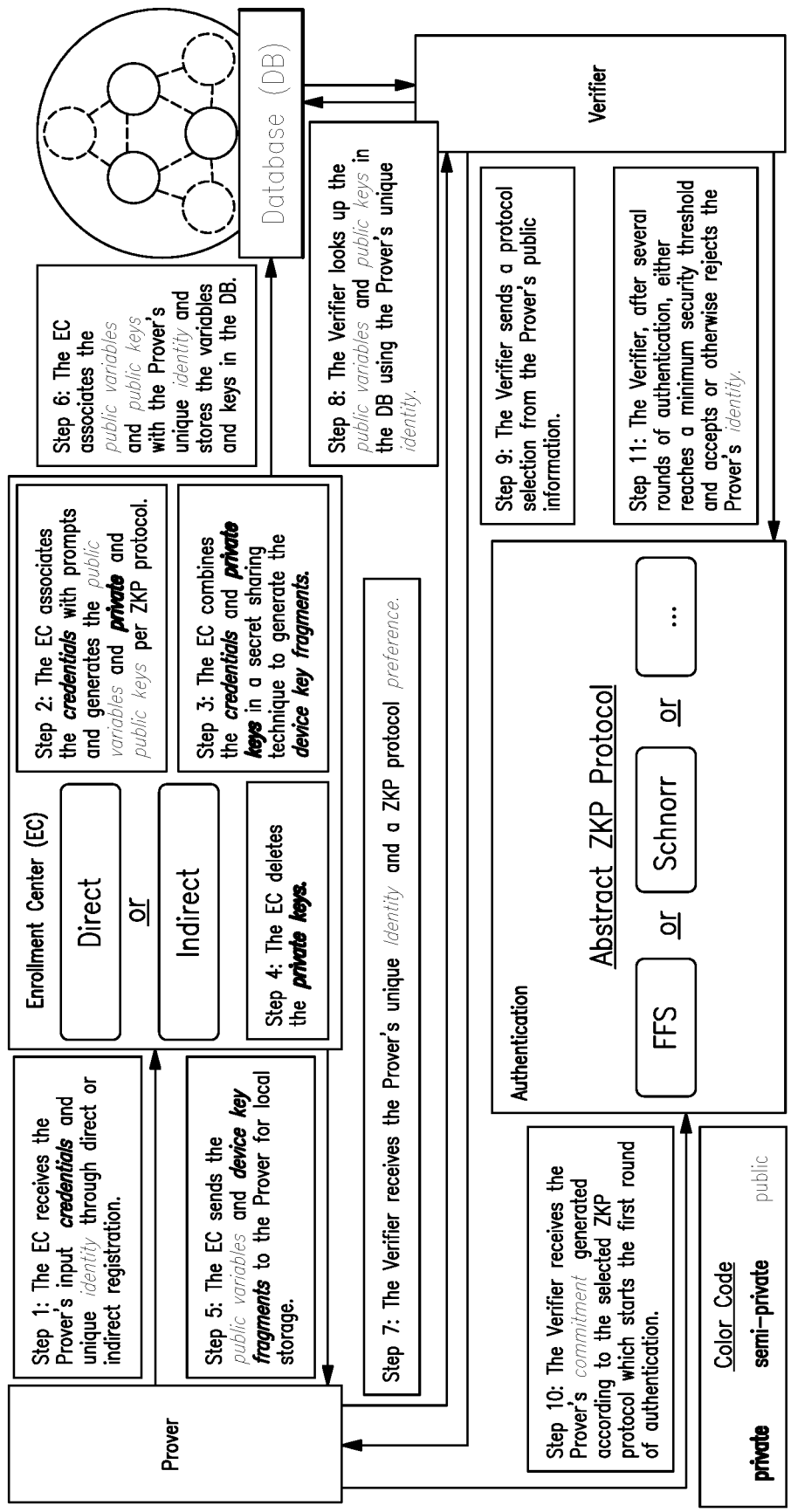
FIG. 22 is a flowchart illustrating the enrollment and authentication process.

Exemplary enrollment and authentication process according to the zkMFA system of the Application—FIG. 22 is a flowchart illustrating an exemplary enrollment and authentication process according to the zkMFA system of the Application. As illustrated by FIG. 22, an authentication method of a prover by a verifier includes: performing at least once, an enrollment process by an enrollment center computer including: enrolling a prover via credentials and identity provided by the prover by use of a prover computer device; associating by computer, the credentials with prompts and generating public variables, private keys and public keys by a generation protocol per ZKP protocol; combining the credentials and the private keys to generate at least one device key share; deleting said private keys from the enrollment center; sending the public variables and at least one device key share to the prover computer device; storing the public variables, public keys, and prover identity associated with the prover computer device in a database; subsequent to performing the enrollment process, performing an on demand authentication process including: receiving at a verifier computer from the prover, a prover authentication request sent from the prover computer device which includes the prover identity and a preferred ZKP protocol identifier; looking up a prover's public key in the database via the identity; the verifier sending a selected ZKP protocol identifier to the prover computer device; commencing a round of authentication by receiving a commitment generated according to the selected ZKP protocol; and repeating the step of commencing a round of authentication until the verifier computer accepts or rejects the prover's identity.

Figure 26:
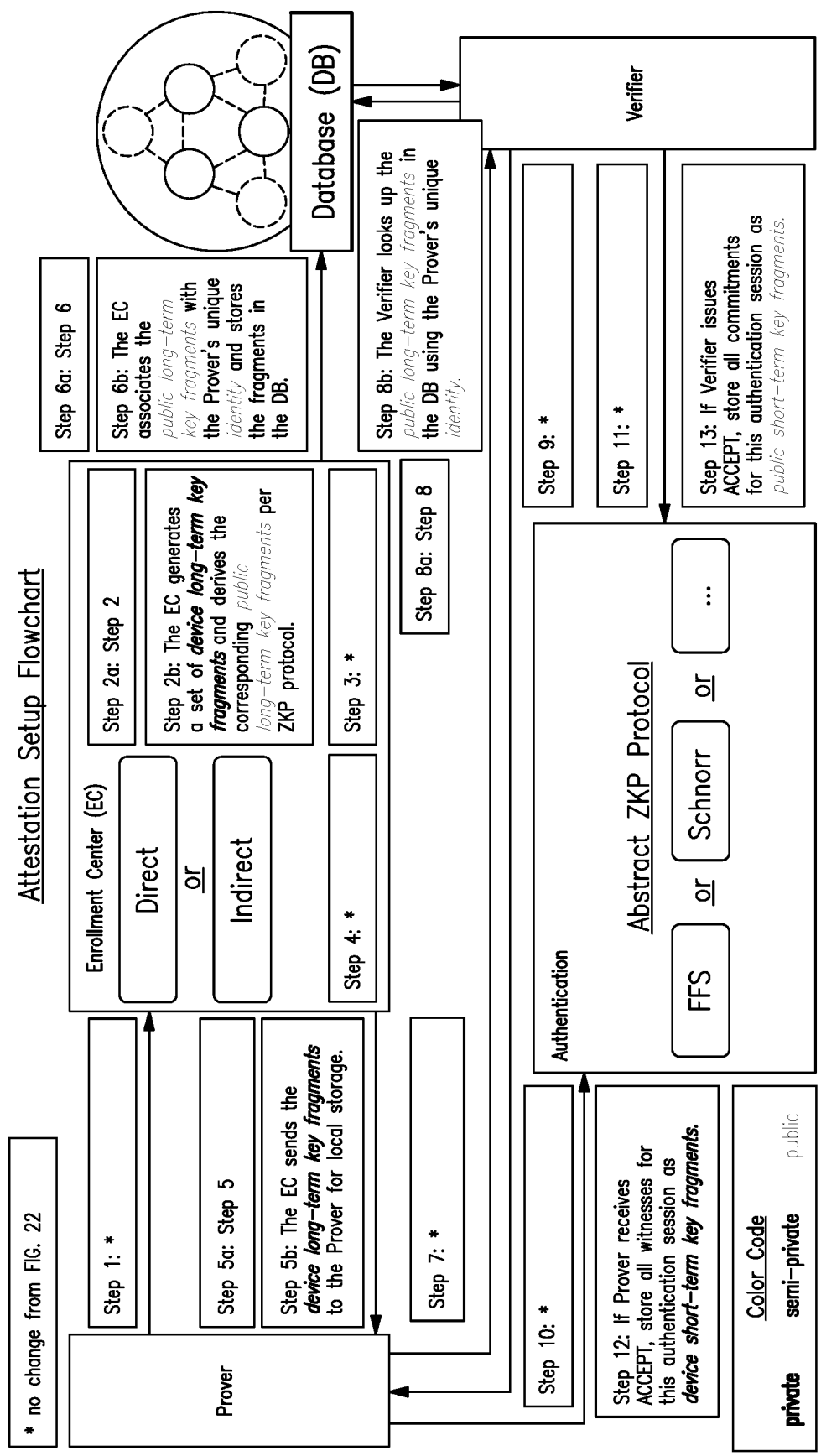
FIG. 26 is a diagram showing attestation setup process during the enrollment and authentication phase.

FIG. 26 is a diagram showing attestation setup process during the enrollment and authentication phase.

FIG. 27 is a diagram showing attestation with the abstract ZKP protocol at a high level.

EXEMPLARY EQUATIONS

FIG. 28 shows Equations 1 and 2 that show how private and public keys are generated with FFS. FIG. 29 shows Equations 3 and 4 that describe how the prover generates a witness and commitment for each round of FFS. FIG. 30 shows Equation 5 which describes how the challenges are generated for each round of FFS. FIG. 31 shows Equation 6 which describes how the prover generates their response for each round of FFS. FIG. 32 shows Equation 8 which describes how the verifier evaluates the prover's response for each round of FFS using Equation 7. FIG. 33 shows Equations 9-14 which prove that Equation 8 evaluates to true if the prover correctly supplies their private keys in Equation 6. FIG. 34 shows Equations 15 and 16 which describe the substitutions a malicious prover could make in a challenge guessing attack on FFS. FIG. 35 shows Equations 17-20 that highlight how a malicious prover could pass Equation 8 if they substitute Equations 15 and 16 for Equations 4 and 6. FIG. 36 shows Equation 21 which describes how the device key fragments are generated from the sets of ZKP private keys and masked credentials. FIG. 37 shows Equation 22 which describes how the ZKP private keys can be recreated from the sets of device key fragments and masked credentials. FIG. 38 shows Equations 23 and 24 which describe how device and public long-term key fragments are generated for FFS. FIG. 39 shows Equations 25 and 26 which describe how private and public session keys are created for attestation with FFS. FIG. 40 shows Equations 27-31 which show how Equation 8 evaluates to true when the session keys are substituted for the ZKP keys in the protocol. FIG. 41 shows Equation 32 which quantifies the negligible fraction of elements that are not co-prime to N.

Part 7—Other Extensions—

7.1 Access Revocation—One possible future extension might be to add the ability to 'unregister' or delete devices that have already been registered. This can be accomplished by using the zkMFA API (or other means) to delete the public key associated with a specific ($id_U$, $id_D$) pair. Deleting a ($id_U$, $id_D$) pair will revoke access for a specific device; to revoke access from the user entirely, all pairs with the user's $id_U$ must be deleted.

7.2 Policy Administration—Additionally, a policy administrator may want to specify certain credentials that a user must enroll with, or require certain credentials for access to a particular resource. This can be accomplished by grouping together a subset of the user's credentials (I) under a policy specifier. When the user is required to authenticate in accordance with a certain policy, only the specified subset of credentials are used in the proof of identity, and the other credentials are ignored. The definition of this subset must be available to both parties (the prover and verifier) such that the verifier can use the corresponding public keys when validating the prover. These policy specifiers can additionally define minimum security thresholds the user must pass to gain access to different resources of varying sensitivities which may be protected under different access policies. Thus the policy will control the number and type of credentials required to access a resource and the security threshold the user must pass to gain access.

7.3 Attestation: Zero-Knowledge Session Management—
It is a time-costly process for a user to enter their personal information several times during an active application session. If resources need to be accessed quickly and often, then performing multi-factor authentication (MFA) for each request might be too burdensome on the user. To make this process more efficient and secure, an attestation protocol is now described which extends from the zkMFA framework as described hereinabove. This attestation protocol allows users to attest to their identity after one successful authentication without inputting or otherwise providing personal information for subsequent authentication requests.

Modern session management solutions of the prior art are flawed in similar ways to modern authentication solutions. Typically, a unique session token is generated to prove that a user has been authorized to access a resource. To maintain security, the token must then be attached to each resource request and protected by various encrypted communication channels. Because this sensitive data is sent over an insecure link, albeit in an encrypted format, modern session management schemes are vulnerable to session stealing attacks. There are several ways in which an adversary could mount a session stealing attack some of which involve stealing the session token while it is sent across the network.

7.3.1—The Attestation Phase

In addition to the Enrollment and Authentication Phases described in Part 6 above, a system administrator can optionally make use of an additional Attestation Phase described herein. The Attestation Phase implements a session management scheme that mitigates security vulnerabilities by using zero-knowledge proofs to verify that the user's device knows the session token without needing to expose it over an insecure connection.

7.3.1.1: Overview—Attestation is a process that proves if a user has previously authenticated by verifying the prover's knowledge of private proof elements generated during each round of prior authentication when the user was required to provide inputs.

Figure 11:
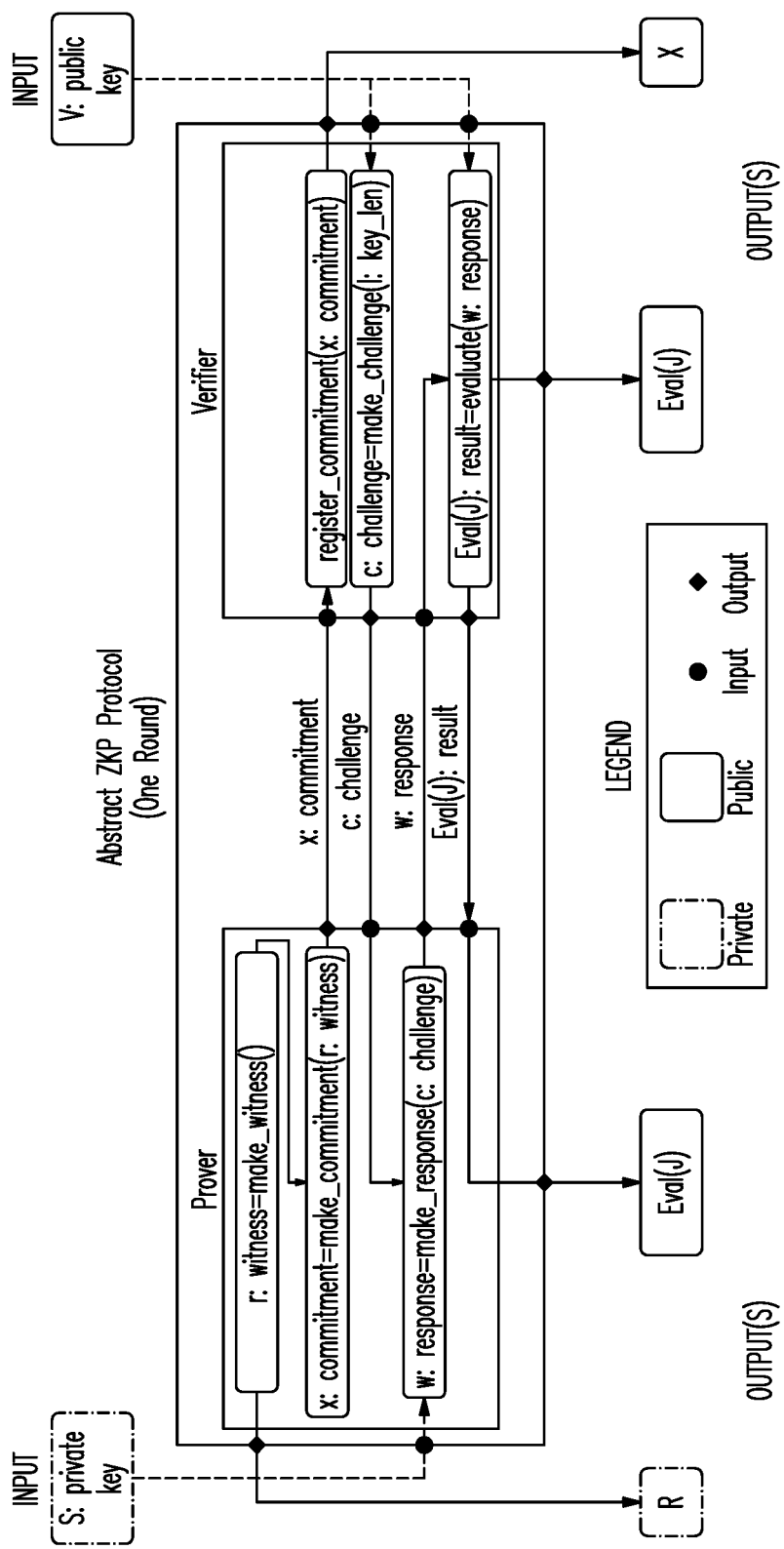
FIG. 11 is a drawing representing an one round of our abstract ZKP protocol according to the Application.
Figure 12:
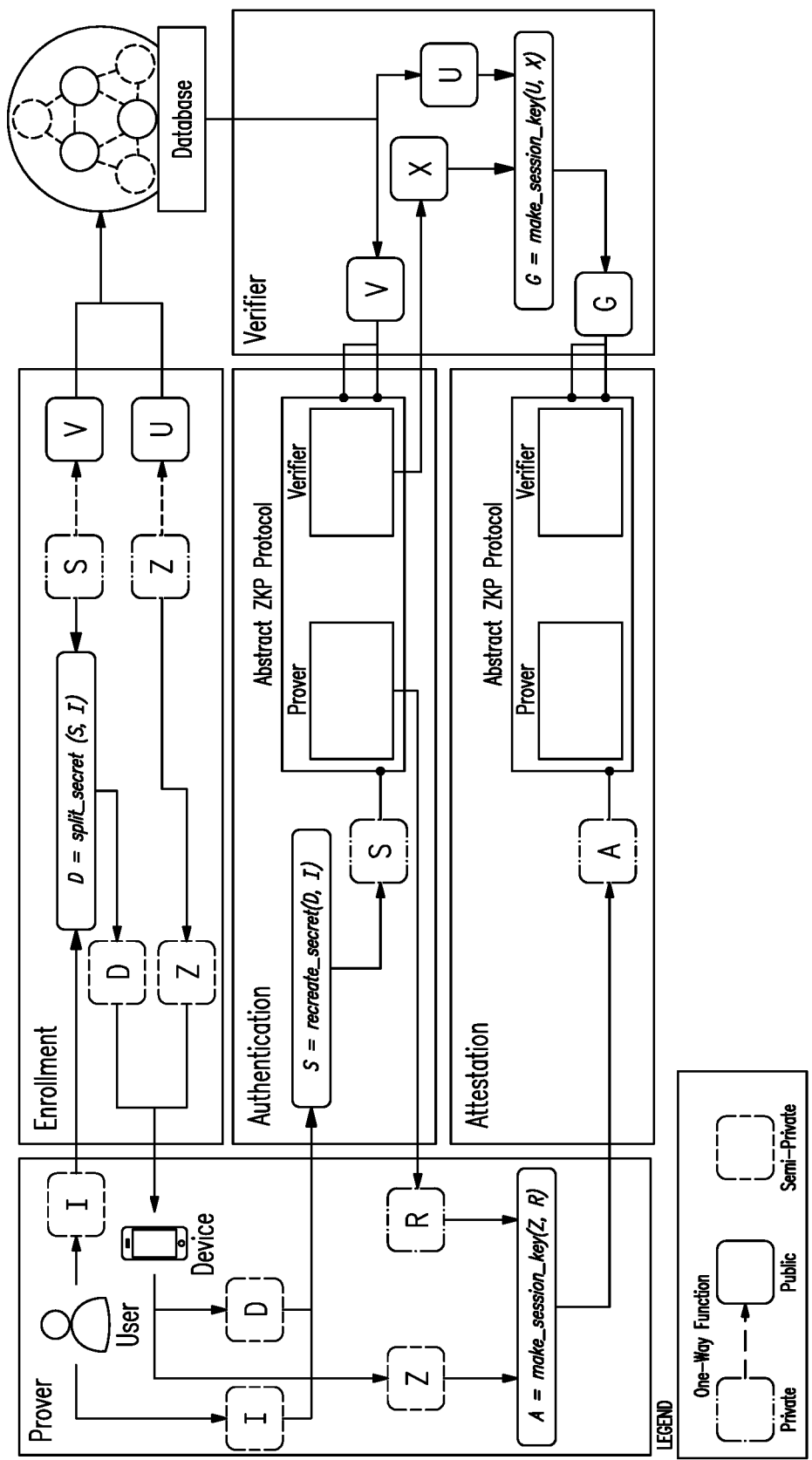
FIG. 12 is a block diagram representing an exemplary flow of data within the system for each phase.

FIG. 11 is a drawing representing our abstract ZKP protocol according to the Application. FIG. 12 is a block diagram representing an exemplary flow of data within the system for each phase. Attestation according to the Application, is accomplished by replacing the inputs to the abstract zkMFA protocol as outlined in FIG. 11, with a new set of derived public/private session keys (rather than the user's public/private keys) and performing another zero-knowledge proof to determine the session's validity. Attestation executes the abstract zkMFA protocol in the same manner as authentication, but with a slight change in that the private keys are not recreated from the user's personal information and device key fragments and are instead generated from two new key fragments. These fragments are generated during the enrollment and authentication phases and stored in separate locations on the user's device so session keys can be generated without the user's input. This lack of user interaction provides a time improvement over authentication and allows access to more resources over a shorter period at the cost of additional storage space.

Figure 13:
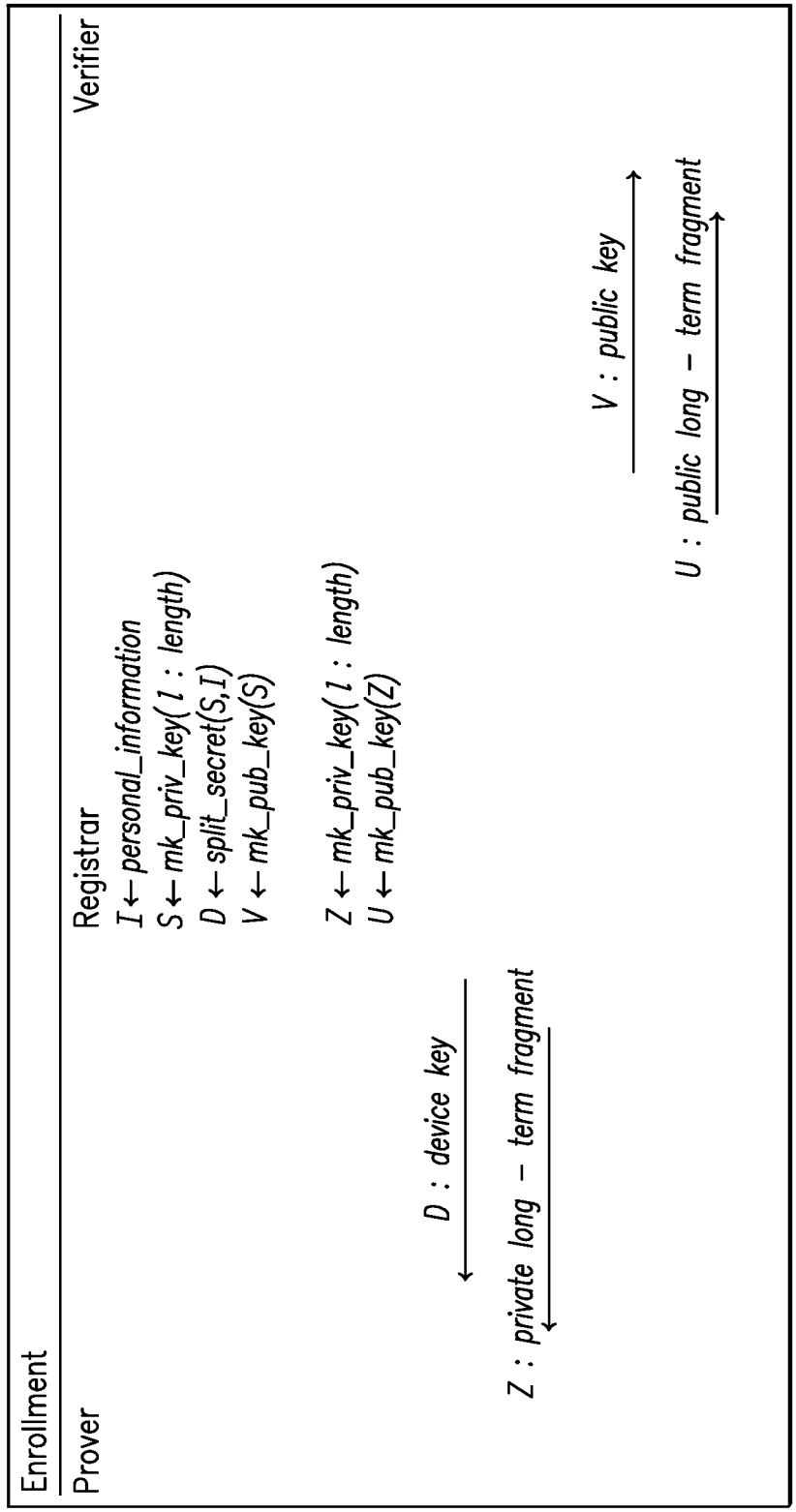
FIG. 13 illustrates an exemplary enrollment procedure extended to include a setup for attestation.

FIG. 13 illustrates an exemplary enrollment procedure extended to include a setup for attestation. FIG. 14 is a table that lists new variables generated during each phase per entity.

The session keys can be derived any time after a successful authentication from two new sets of key fragments: the short-term fragment, composed of prior authentication elements, and the long-term fragment which identifies the device and adds cryptographic security.

Figure 15:
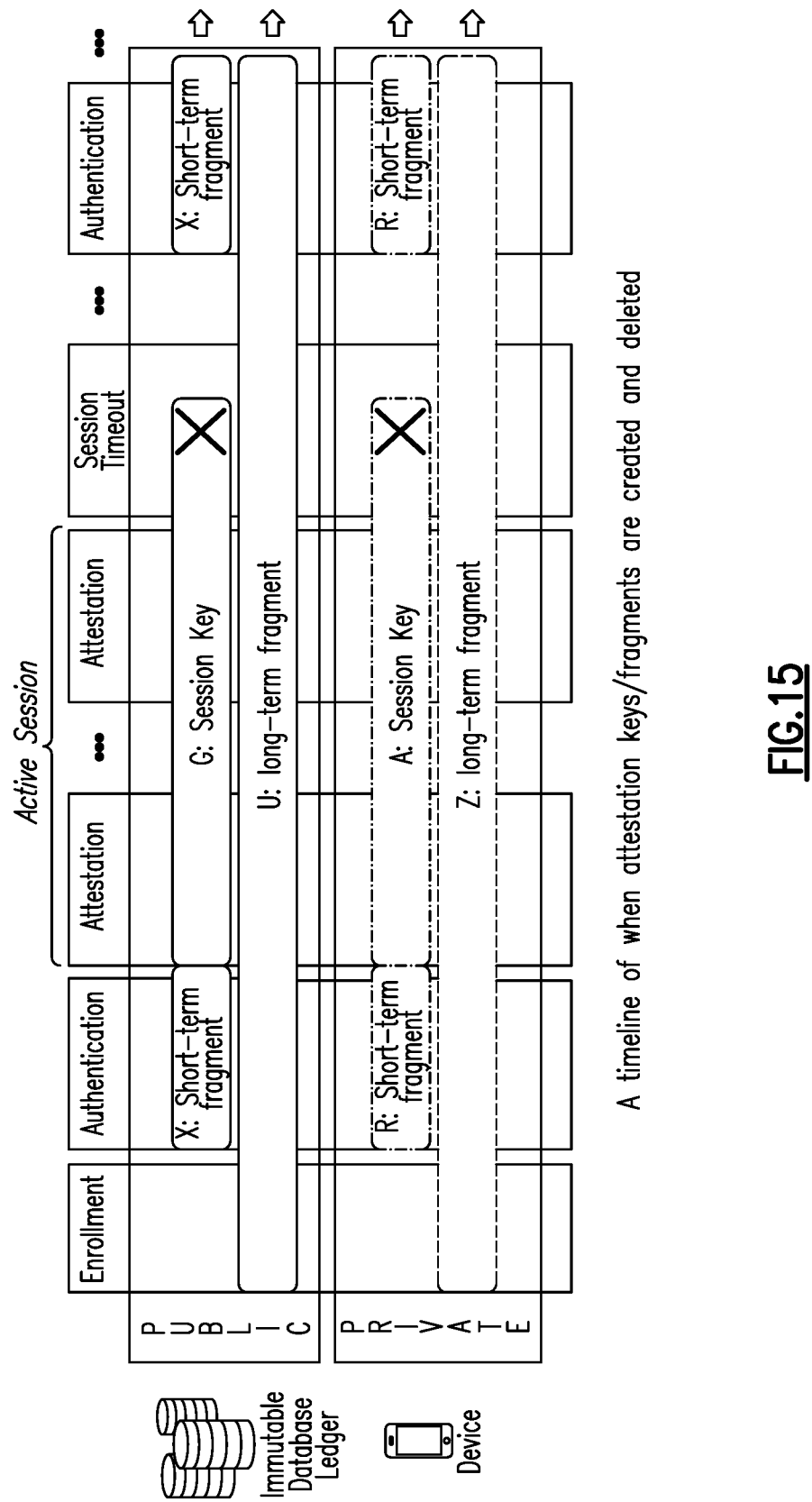
FIG. 15 is a timeline depicting exemplary lifecycles of various keys/fragments.

FIG. 15 is a timeline depicting exemplary lifecycles of various keys/fragments. As shown in FIG. 15, the private session key exists on the prover and the public session key on the verifier until the prover's session ends at which point the respective session keys are deleted on both parties. Notice that the long-term fragment stays on the device indefinitely until it is either updated or deleted. Deleting the long-term fragment prevents the prover from performing attestation but does not affect their ability to authenticate. The following sections describe the keys/fragments in greater detail and the specifics of how and when they are generated.

7.3.1.2: The Long-Term Fragment—The long-term fragment is generated by the EC during enrollment and is made up of two components:

the public component (U) that is stored alongside the user's other public information ($id_U$, $id_D$, and V) in the database;

the device component (Z) that is stored on the user's device along with the other set of key fragments D (a.k.a. device registration).

During enrollment, the long-term fragments are generated separately from the user's public and private keys but in a similar manner (the specifics of which depend on the ZKP implementation). Unlike the device registration (D), the long-term fragments are independent of the user's personal information and private key, and are only used for maintaining the user's session.

FIG. 13 illustrates an exemplary enrollment procedure extended to include a setup for attestation. As shown in FIG. 13, as a result of similar key generation equations, the pairs of long-term fragments Z and U have the same mathematical relationship as the private key S and public key V. Because these fragments and keys have this equivalent relationship, the long-term fragment is cryptographically strong enough to be used by itself as an session key but using the long-term fragment alone to generate the session key is not recommended because it introduces other security vulnerabilities.

For sufficient security, the long-term fragments (public and private) should be generated in accordance with certain requirements, they should:

have the same mathematical relationship as the user's public/private keys, and have at least the same length 1 as the user's public/private keys.

Generating the long-term fragments in the same manner as the public/private keys ensures that the long-term fragments are cryptographically secure and can be substituted in the zkMFA protocol. Similarly, the length of the long-term fragments directly correlates to the length of the session keys, so if the long-term fragments have a minimum length of l (equal to the user's public/private keys) where $Z=\{Z_1, Z_2, \ldots, Z_l\}$ and $U=\{U_1, U_2, \ldots, U_l\}$, then the session keys also have a length of l which ensures that attestation finishes in no more than m rounds (equal to the number of rounds of authentication).

Including the long-term fragment as part of the session key provides several additional benefits. Because the long-term fragment is generated via a trusted third party and stored on the device, the long-term fragment acts as a unique device identifier during attestation (in a similar manner to how the device key acts as a unique device registration during authentication). By using two fragments to generate the session key, no fragment by itself will be enough to grant an adversary access or provide them with any additional information that will help them gain access. A user must be in possession of the session key (a combination of both fragments) to attest successfully, and a single fragment is not enough to predict the combined session key.

7.3.1.3: The Short-Term Fragment—The short-term fragment is generated during authentication and also made up of two components: the set of private proof witnesses (R) and corresponding set of public commitments (X) from each round. These values act as a set of authentication transcripts that can uniquely identify an authentication session. After m successful rounds of authentication, the user's device (the prover) knows the private set of witnesses R={$R_1,R_2,\ldots,R_m$} and the verifier knows the related public set of commitments X={$X_1, X_2, \ldots, X_m$}. Together, these sets make up the private/public components of the short-term fragment that, when combined with the long-term fragment, generate the session key (See FIG. 12). The specifics of how these keys are generated and their requirements depend on the underlying ZKP implementation (i.e., FFS, etc.) used during authentication.

7.3.1.4: The Session Key—Like the short-term and long-term fragments, the derived session key also has its public/private components: A, the private session key, and G, the public session key. Although the session keys are derived from fragments (rather than generated at enrollment), the mathematical relationship between their public/private components is equivalent to the relationship between the user's private key (S) and public key (V) and can thus be substituted as inputs in the abstract zkMFA protocol. The private key in FIG. 11 is replaced with the private session key and the public key is replaced with the public session key. When the prover responds to the challenge, they respond using the values stored in the private session key rather than prompting the user for their personal information.

Combining the long-term fragment with the short-term fragment to generate the session key provides several additional benefits. The short-term fragment identifies the authentication session, which requires user interaction and system authorization. By including the short-term fragment, attestation ensures that a user has verified their personal information at least once since enrollment. Including the short-term fragment also guarantees relevancy, the short-term fragment changes with each new authentication session and propagates updates to the session key. To gain access for a given session, an adversary would need to access the user's device while the session is active. At any other point in time, the device would only know the long-term fragment (See FIG. 15) which would not be enough to fraudulently authenticate because the session key is generated in such a way that a single fragment does not give an adversary any additional insight into predicting the session key.

As shown in FIG. 16, including the short-term fragment also allows for more granular access revocation methods. To revoke an authentication session, an administrator can delete the public session key. Deleting the public session key has minimal impact on the user since their public key and public long-term fragment will remain unaffected. To recover the ability to attest their identity, the user must re-authenticate by providing their personal information to continue with a new session. If more severe measures are required, the administrator can also delete the public long-term fragment which prevents the user from using attestation altogether. The user can still access resources, but they must now always provide personal information during authentication. As a last resort, the administrator can delete the user's public key and revoke access altogether. Revoking access altogether requires the user to re-enroll by returning to a secure location and re-entering their information in the enrollment terminal.

7.3.1.5: Properties of Attestation—Because the public/private session keys have the same cryptographic properties as the user's public and private keys, they can safely be substituted during authentication. However, because the session keys are dependent on ZKP proof elements, the user must authenticate at least once before performing attestation. After a user has authenticated at security threshold (t), they can perform attestation at the same threshold because the session keys are of equal length/to the user's public/private keys. If 1 remains constant, attestation can reach the same security threshold as authentication in the same number of m rounds by satisfying the threshold equation t<=mk. Additionally, by trading storage space, attestation can be accomplished in fewer rounds than authentication. An implementor can opt to increase the length of the session key to a value larger than 1 so that the security threshold can be reached in fewer rounds. This can be accomplished by generating a longer long-term fragment during enrollment which directly correlates to a longer session key and ensures fewer rounds of attestation for equivalent security. As with authentication, the specifics of the security properties and mathematical calculations of attestation depend on which ZKP protocol is used within our zkMFA framework. As a proof of concept, attestation has been implemented for the FFS protocol to show how our zkMFA framework can be extended to enforce session management capabilities.

7.3.2: Attestation with FFS

To show how different ZKP protocols fit into the extended framework, we have implemented attestation with FFS which is based on the integer factorization problem. Attestation with FFS is very similar to FFS authentication where the private long-term fragments are generated in the same manner as the user's private keys on the EC during enrollment: each private long-term fragment $Z_i \in Z$ is randomly sampled from Z/NZ (See Eq. 23) and the corresponding public long-term fragments have the form described in Eq. 24. This is the same relationship as with the sets S and V (See Eqs. 1 and 2). Like with each $S_i \in S$, it is required that all $Z_i \in Z$ be invertible modulo N, where N is the same value that was previously described in Part 2.1.

As stated in Part 7.3.1.3 hereinabove, the short-term fragment is made up of the set of witnesses (R) and commitments (X) generated during each round of FFS authentication where each $R_i \in R$ is randomly sampled modulo Z/NZ and each commitment $X_i$ is derived from $R_i$ (See Eqs. 3 and 4). Note that this step is already performed as part of the FFS implementation of the zkMFA framework. The set R remains on the device and the set X is sent to the verifier during authentication.

Once a user successfully authenticates, the session key can be derived separately by the prover and the verifier without any additional communication. The prover derives their private session key by evaluating Eq. 25, which adds the additional restriction during authentication that each witness $R_i$ be invertible modulo N in Part 2.1.

FIG. 17 is a diagram showing exemplary equations for generating a long-term fragment, short-term fragment, and session key for attestation with FFS. As shown in FIG. 17, the verifier simultaneously derives their public session key by evaluating Eq. 26. The resulting private session key A={$A_1, A_2, \ldots, A_l$} is stored on the prover and public session key G={$G_1, G_2, \ldots, G_l$} is stored on the verifier and have the same mathematical relationship as S and V, as shown in Eqs. 27-31.

The resulting public and private session keys can be used in place of the user's private and public keys during authentication—not only because they have the same mathematical relationship, but also because they are uniformly random within Z/NZ and have the same distribution as the prover's original ZKP private key which itself is made up of secrets that are uniformly sampled from Z/NZ. The multiplication of the key fragments that make up the attestation keys also result in a uniformly random distribution because the sets Z and R (and correspondingly U and X) are also uniformly random and from Z/NZ. This property is important for security as an adversary looking to misrepresent their identity has no better chance to do so other than randomly attempting to determine the private key given the public key. Even in the extreme scenario where the adversary learns the prover's private witnesses (the device short-term key fragments) from prior authentication, the resulting attestation private session key remains uniformly random since the device long-term key fragment remains uniformly random given the adversary's knowledge.

Part 8—Technical Details

An exemplary library to implement a zkMFA protocol according to the Application, is broken into two parts: zkck and zkregistrar. Note that these libraries are documented hereinbelow in C++ but can be translated to any suitable language:

the zkck library contains the core logic of the prover and verifier as well as utilities for working with keys, masks, and key fragments;

the zkregistrar library contains the extensions for the EC and multi-factor authentication.

The logical separation between libraries can be enforced such that user-facing applications such as mobile or web apps designed for authentication can link against only the zkck library for minimum required functionality. Meanwhile, the zkregistrar library is reserved for trusted applications running on trusted devices, so that the implementation of the EC is only visible to such devices. The following parts provide a description of the high-level structure of the two libraries and some of their more important components.

8.1—Implementation of Zkck

Figure 2:
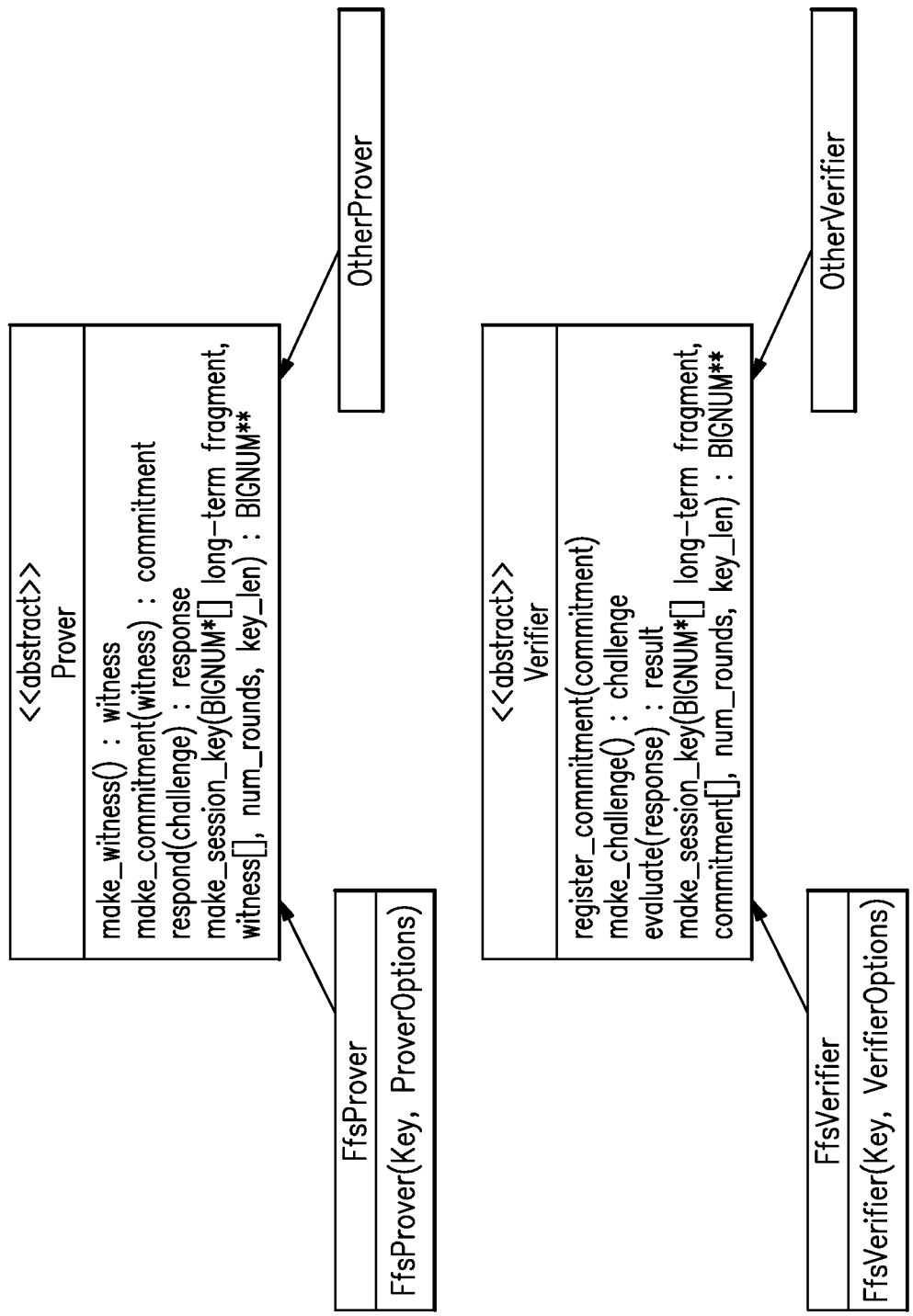
FIG. 2 is a drawing showing exemplary generic protocol classes for a Prover and Verifier.

The bulk of the core logic of the abstract zkMFA protocol is encapsulated by the abstract classes Prover and Verifier, (see FIG. 2 for an exemplary drawing of these generic protocol classes). These classes define a common interface to execute the basic protocol as defined in Part 2:

Prover::make_witness generates a random witness r

Prover::make_commitment uses the witness to generate and return the commitment x Verifier::register_commitment accepts or rejects the commitment, Verifier::make_challenge generates and returns the challenge value c, Prover::respond accepts the challenge and calculates and returns the response w and Verifier::evaluate accepts the prover's response and generates the evaluation of a judgement (J) which determines whether authentication should proceed with more rounds (in which case the protocol starts back at Prover::make_witness), or ends definitively by either accepting or rejecting the prover's identity. This abstract protocol can be visualized in FIG. 11.

Once a prover is successfully authenticated, both the prover and verifier can optionally derive session keys for later use during Attestation (as described in Part 7.3) with the following functions:

Prover::make_session_key(device long-term fragment, witnesses, m, l) takes the prover's long-term fragment, and the witnesses from m rounds of authentication and returns a private session key.

Verifier::make_session key(public long-term fragment, commitments, m, l) takes the verifier's long-term fragment, and the commitment from m rounds of authentication and returns a public session key.

Once derived, these public and private session keys can be used in place of the users secrets to maintain an active authentication session.

The protocol is purposefully abstractly defined so specific computations for different ZKP implementations can be delegated to concrete subclasses (e.g., FfsVerifier and FfsProver) which can be dynamically interchanged for specific protocols. This allows other systems to integrate the Prover and Verifier, without reference to any specific implementation.

Internally, the values r, x, c, and w in our exemplary library are represented by the OpenSSL BIGNUM* type, which holds arbitrarily large integer values. This is necessary because most numbers involved in the protocol have at least 1024 bits (far surpassing the native integral types on any common architecture) which is crucial to the security of the protocol. However, any library/program capable of handling sufficiently large numbers could be used. As previously mentioned, this protocol is sufficiently generic so as to accommodate a variety of potential authentication methods, represented in FIG. 2 by the OtherProver and OtherVerifier classes. We have implemented the FFS protocol through the FfsProver and FfsVerifier classes as a proof of concept. These classes instantiate the abstract protocol with the specific operations and keys required by our extended FFS protocol as described in Part 2.1.

To instantiate a concrete Prover subclass, the private key must be supplied along with a ProverOptions structure. Similarly, to instantiate a concrete Verifier subclass, the public key must be supplied along with the corresponding VerifierOptions structure, which allows the Verifier to evaluate responses as described in Part 2. These options structures provide a configuration for both classes and contain the following variables:

VerifierOptions:

mode—the thresholding mode, which determines whether thresh represents an absolute number of successful rounds or the value of mk, where m is the number of successful rounds and k the length of the challenge;

thresh—the minimum threshold value (t);

min_length—the minimum acceptable length of a challenge;

max_prompts—the maximum number of prompts given in one authentication session;

ProverOptions:

incremental—whether to incrementally unmask keys as questions are asked;

and get_credentials—a callback function used by the prover to retrieve inputs from arbitrary I/O sources.

Keys are represented internally by a dedicated Key class (See FIG. 5), which manages the schema (a metadata structure for interpreting the data) and an array of protocol information called proto_collection defined by the Proto class.

The Proto class stores persistent data specific to each ZKP protocol (i.e., FFS, etc.) such as public/private keys and other public variables necessary for computations. The set of public variables (pub_vars) is represented internally as a mapping of BIGNUM* values to their variable names. For the exemplary implementation, public variables are always generated by the EC during enrollment through a similar abstract interface so, depending on the implementation, public variables, private keys and public keys can be dynamically generated for different protocols by defining different subclasses.

The Proto class also stores a data array that constitutes the prover and verifier's keys. Since each protocol generates public and private values differently, each protocol will have a separate set of keys that apply to the same set of user credentials (I). For the prover, the data array contains the set of device key fragments (a.k.a. device registration) and optionally a long-term fragment and private session key. For the verifier, the data array contains the set of public keys and optionally a long term fragment and public session key.

The Key class also stores the Schema, as mentioned before, which is a metadata structure that determines how each protocol's data should be interpreted. The schema consists of a hash_size (the output size of the hash function, in bytes) and a list of mask definitions (mask_defs) which specifies how many credentials a user has enrolled with. Because the masking algorithm described in Part 3.2 expands the user's inputs, one user credential may correspond to multiple keys in the data sets of each protocol. The number of masks derived from a single credential is called the span. The array of mask_defs in the Schema also keeps track of the span of each credential and the prompt to display to the user if that credential is selected. In some cases, a credential may require the user to produce a scan (e.g., scanning an RFID tag) in which case the prompt text may be blank. However, each mask can be identified by its unique prompt ID ($id_Q$). This prompt ID may be used to distinguish between different user inputs (for example, a text based input with $id_Q=0$ may display an input field while an RFID scan with $id_Q=1$ may delegate to some external scanner to obtain the user's inputs). FIG. 5 is a drawing illustrating exemplary classes associated with the internal representation of keys.

Additionally, the Key class may optionally also store an array of policies. This is not necessary for proper functionality of the protocol but may be useful to system administrators when additional restrictions and requirements on authentication are necessary.

To simplify the creation of a specific Prover and Verifier subclasses, the ProverFactory and VerifierFactory classes are used. These factory classes dynamically output Provers and Verifiers for different keys and protocols. This dynamic generation allows an implementor to hold off creating a Prover or Verifier instance until it is needed. This is useful in particular for verifiers who have access to multiple public keys. By delaying Verifier creation through the VerifierFactory, an implementor can wait until a prover provides their unique identity to lookup the appropriate key and instantiate a Verifier. Similarly, if a prover entity is storing multiple keys for different users, the ProverFactory can wait until a specific key is selected before instantiating a Prover. This also allows multiple Prover and Verifier instances to be generated on a single endpoint. A "verifier" endpoint can actually be multiple Verifier instances and a "prover" endpoint can hold multiple Prover instances. By generating multiple instances, a "verifier" can authenticate multiple provers at a time. Lastly, these intermediate Factory interfaces encapsulate the logic for generating Provers and Verifiers of different protocols to remove this burden from the implementor. FIG. 6 is a drawing illustrating an exemplary VerifierFactory and ProverFactory hierarchy and functionality.

The following is a more detailed description of the masking process which makes use of the Key::mask method which accepts an array of user credentials and returns an array of masks. FIG. 4 shows the algorithm in general, where piece (h, i, n) is a function that extracts the i-th piece of length n bits from the bit vector h. Informally, for each $H_i$=HASH($I_i$) of span $L_i$, the algorithm breaks up this hash of the personal information $I_i$ into $L_i$ pieces of equal width (i.e., the span), then hashes those pieces again and subtracts them from the corresponding value in S. If the span $L_i$=1, each $I_i$ is ultimately hashed twice; if $L_i$=2, each $I_i$ is split in half and each half is hashed again and added to $S_i$ and $S_{i+1}$, and so on.

Figure 3:
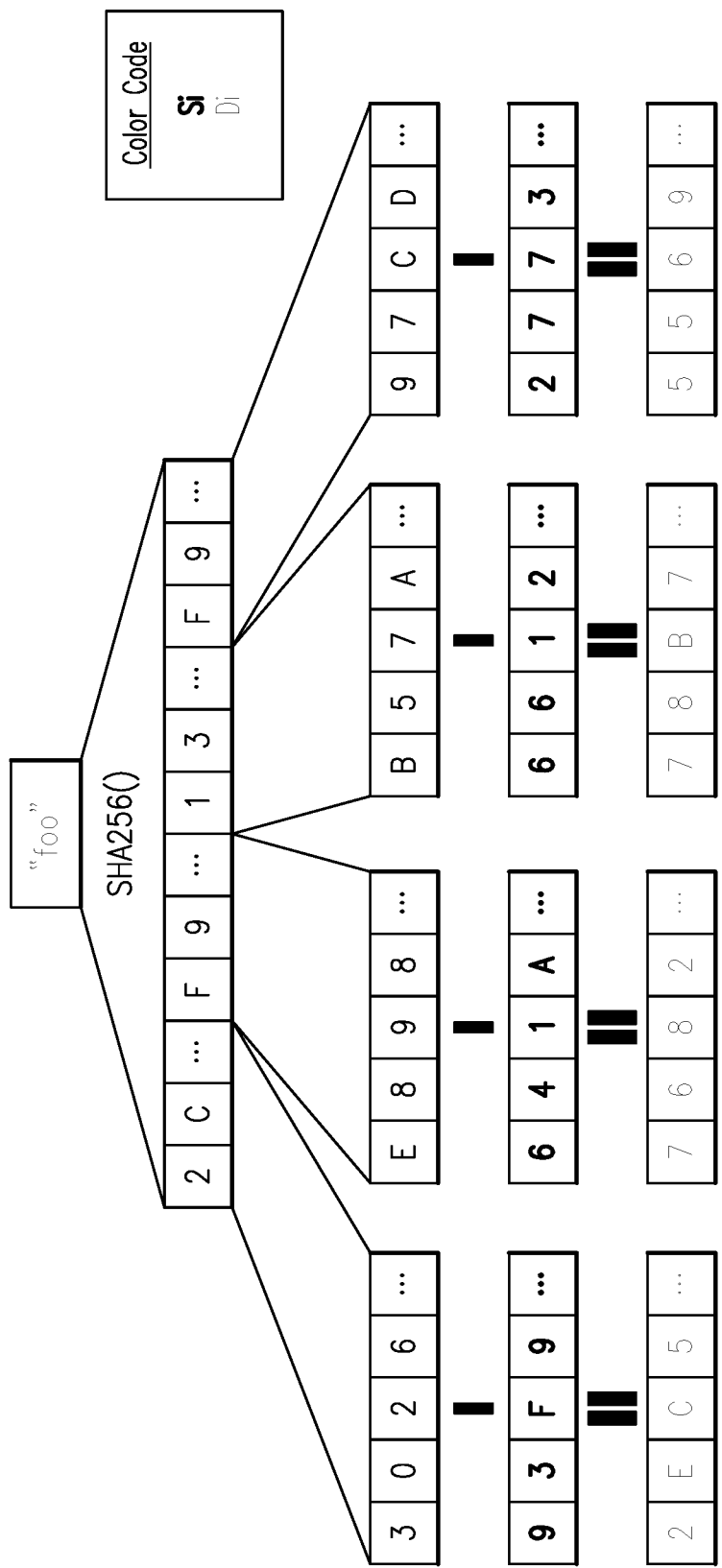
FIG. 3 is a drawing illustrating the masking process on the answer foo.

FIG. 3 is a drawing illustrating the 'hash tree' masking process on a text-based credential "foo". In FIG. 3, "foo" is first hashed with the SHA-256 algorithm, then broken up into four equal pieces, each of which is hashed again and subtracted from one $S_i$ in S. For brevity, only parts of the full hash values are shown therein. The numbers in red are the values of $S_i$, while those in green are the computed values of $D_i$. The key fragment allows the private key to be recovered with the same hash-tree concept by adding rather than subtracting the resulting hashes to each number (See Eqs. 21 and 22).

Together, the Prover and Verifier classes and their concrete implementations FfsProver/FfsVerifier, etc., are sufficient to perform a zero-knowledge proof of identity, provided they can agree on a unique identity associated with the prover and their corresponding public keys V and private keys S. However, to agree on the (S,V) pair is not a trivial undertaking and requires a trusted database that can be accessed by the EC to write public keys and the verifier to read them. This functionality is described as part of the zkregistrar library below.

8.2—Implementation of Zkregistrar

The separate zkregistrar library provides an implementation of the EC and a variety of backends for storing information. The logic of the EC is encapsulated by the Registrar class, which provides functionality to add new users into the system and add new devices for existing users.

Figure 7:
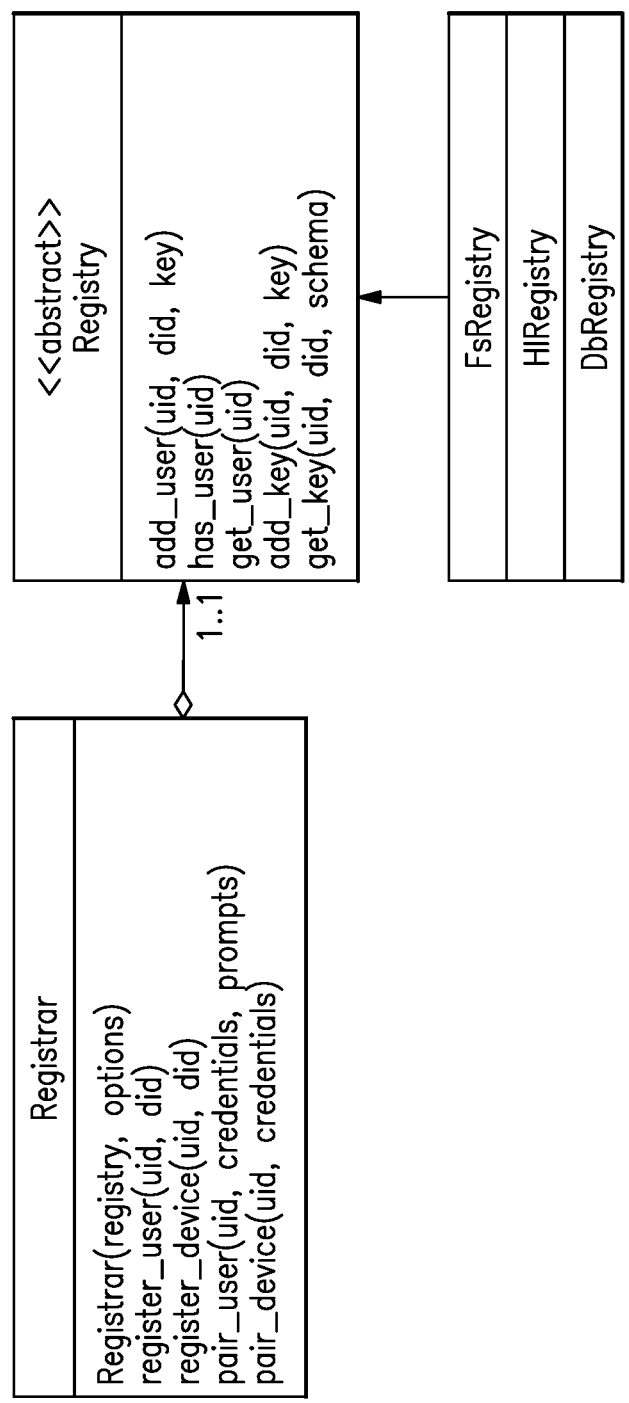
FIG. 7 is a drawing showing an exemplary Enrollment Center (EC) implementation called the "Registrar" and associated classes.

FIG. 7 is a drawing showing an exemplary Registrar and associated classes. The underlying storage is encapsulated by an abstract class called the Registry as shown in FIG. 7. The concrete implementations of Registry can be any data storage system, however, the storage system must have the required properties as discussed in Part 4.

The Registrar interface provides for the two methods of registration, direct or indirect, via the pairs of methods register_user and register_device, and pair_user and pair_device, respectively. The register_user and pair_user methods are used for first-time registration of new users, while register_device and pair_device are used for registration of new devices. When creating a Registrar instance, a RegistrarOptions structure should be supplied similar to that described above for the Prover and Verifier classes, with the following fields:

require_pairing—whether to require indirect registration, i.e., disable direct registration;

pair_timeout how many seconds a user has to pair before their session is closed;

The abstract Registry interface provides a high-level abstraction of the underlying storage mechanism. Any such mechanism must provide methods for adding user entries with their initial key (add_user), adding secondary device entries to that user (add_key), querying the existence of user entries (has_user) and their associated data (get_user), and retrieving the key associated with a particular user and device (get_key).

8.3—The Exemplary Communication Protocol

FIG. 18 shows an exemplary serialization of a prover key in JSON. Most data is serialized in JSON format with numbers in hexadecimal representation as strings but any other representation for large numbers can be used. JSON formatted keys are represented by two fields: a proto_collection array to store protocol specific data, and the schema to provide metadata for interpreting the keys, as shown in FIG. 18.

There is a specific sequence of requests and responses that must be followed by any conforming prover or verifier during an authentication session. The prover initiates authentication by sending an authentication request to the verifier containing its (the prover's) unique identity (composed of the unique user and device identities) and associated metadata.

The verifier will respond to this request with CONTINUE if the session can continue, and a ZKP protocol identifier which selects which protocol the prover will use, or an error code. Conforming provers must be able to respond appropriately to an error code at any time, as verifiers are free to issue errors at any point. If the request was successful, the prover must send another request with their commitment generated according to the selected protocol as a single hexadecimal number. A successful response from the verifier will return an array of boolean values as the challenge. Finally, the prover must calculate and send their response as another single hexadecimal value. The verifier's evaluation determines the outcome of that authentication round:

a CONTINUE response indicates that more rounds must be performed, and the prover should send another commitment;

an OK response indicates that the user's identity was accepted; and an UNAUTHORIZED response indicates that the user's identity was rejected.

This protocol could be used to monitor access requests on a network. The unique user and device identifiers that make up the prover's identity in the initial request can determine which account is requesting access and how often. Multiple UNAUTHORIZED responses from a verifier can indicate a potential attempts to gain illegitimate access. System administrators can also choose to include other details such as time of day, IP/MAC address, etc. in their logging details.

The Registrar also accepts requests, and behaves like a typical server in that requests can be received in any order from multiple clients at once to enroll new users.

New keys can be created in two ways: by sending an enroll request with the prompts and credentials needed to create the device key fragment (for direct registration), or by sending a pair message with the prover's identity (a pair of (user ID, unique device ID)), session ID, and pairing code (for indirect registration). Successful requests to the Registrar always result in an OK response and similar logging mechanisms can be applied to monitoring enrollment traffic.

In summary, the new zero-knowledge multi-factor authentication framework (zkMFA) described hereinabove takes advantage of the unique properties of zero-knowledge proofs, multi-level security (MLS) systems, and secret sharing techniques to authenticate users and their devices in various operating environments. zkMFA is a lightweight, frictionless, customizable, and arbitrarily repeatable authentication scheme with the following properties:

Zero information leakage—user and device authentication is performed without disclosing sensitive information held by the user or device to any other party, including the authenticating computer Configurable Security—authentication can be performed at varying degrees of scrutiny;

Public storage—authentication does not require sensitive data to be stored on any server or client side system.

To improve the usability of the zkMFA framework, a new hash-tree splitting concept is also described that allows a single user credential to be split up into multiple components as to afford users higher security with fewer inputs to the system. In our zkMFA framework a zero-knowledge proof (ZKP) requires the use of multiple secrets to decrease the odds of a false-positive authentication. Without this hash-tree splitting concept, the user would be required to enter several credentials during each authentication session which is not conducive to a frictionless user experience. So, the hash-tree splitting concept is introduced to mitigate any tradeoff between security and usability.

A new Distributed Architecture for Authentication is also described to improve the availability and protect the integrity of public authenticating data: This Distributed Architecture can sustain damage to part of the system and still retain full functionality. Redundancy, integrity and fault-tolerance can be provided by the use of immutable distributed ledger (IDL) technology (such as Hyperledger fabric our exemplary IDL). The unique properties of IDLs combined with ZKPs makes our authentication framework resilient to adversarial network operations, reconnaissance and exploitation while still being accessible for user authentication.

A new Trustless Decentralized Peer-to-Peer Authentication framework is also described: Users can authenticate each other without the need for a third party to control the process or serve as the transactional authority. If each party has access to the database, is capable of supporting the authentication protocol, and has a communication path, they can authenticate each other.

A new solution for the multi-agency problem is also described through the combined technologies of IDLs and the zkMFA framework: Often, sharing resources between various agencies can become problematic since each agency wants complete control of their own resources and are reluctant to share their internal authentication criteria with outside entities. According to the new zkMFA system and method of the Application, each agency can have its own IDL where they can control access and the data within. Agencies can then allow other agencies to read from their IDL via standard communication methods such as smart contracts. This allows for users in Agency 1 to authenticate users in Agency 2, and vice versa without worrying that an agency (or outside source) manipulated the IDL in any unwanted fashion. Each agency has complete control of what data is accessible by outside agencies. This information sharing is made possible by the public nature of the zkMFA authenticating data, which discloses no sensitive information about its users and/or their devices.

We also describe a new key fragmentation technique that splits a cryptographic key into multiple key fragments according to the zkMFA system and method of the Application. This secret sharing technique desensitizes the data so that storing authentication keys in vulnerable storage methods (e.g., Intel's SGX or Android's Key Exchange) does not compromise the security of the overall system.

Also, a new Detachable Subsystem of Nodes for Mobile Authentication is described to allow for dynamic systems and network segmentation: The system allows for a given IDL subnetwork of nodes to be detached from the base network and act as an independent authentication subsystem. This is useful in such cases when a small team detaches from a larger group (e.g., when a military unit deploys its force) but still requires local authentication to access a device or service. While detached, users are able to make authentication related queries for data residing within the subnetwork, which enables deployed teams to utilize the same authentication framework in both populated and isolated network environments.

Attestation: a new Zero-Knowledge Session Management scheme is also described which allows users to maintain an active authentication session for a short period of time (as defined by a system administrator). With this session management technique, resource managers are able to continually validate users via sequential zero-knowledge proofs without requiring users to re-authenticate for each subsequent resource request. This allows users to efficiently access more resources while their authentication session is active. If a user has successfully authenticated at least once with our zkMFA scheme, then they can use our new zero-knowledge session management scheme to repeatedly validate their identity with no additional burden on the user.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

Any part of a zkMFA zero-knowledge based multi-factor authentication system, as described hereinabove can be stored on and/or provided on a computer readable non-transitory storage medium. A computer readable non-transitory storage medium as non-transitory data storage includes any data stored on any suitable media in a non-fleeting manner. Such data storage includes any suitable computer readable non-transitory storage medium, including, but not limited to hard drives, non-volatile RAM, SSD devices, CDs, DVDs, etc.

REFERENCES

[1] Uriel Feige, Amos Fiat, and Adi Shamir. Zero-knowledge proofs of identity. Journal of Cryptology, 1:77-94, 06 1988.

[2] Schnorr C. P. (1990) Efficient Identification and Signatures for Smart Cards. In: Brassard G. (eds) Advances in Cryptology—CRYPTO' 89 Proceedings. CRYPTO 1989. Lecture Notes in Computer Science, vol 435. Springer, New York, N.Y.

[3] Menezes, A. J., et al. Handbook of Applied Cryptography. CRC Press, 2001.

[4] L. Guillou and J. J. Quisquater. A "paradoxical" identity-based signature scheme resulting from zero-knowledge. Advances in Cryptology—CRYPTO '88, Lecture Notes in Computer Science Vol. 403, S. Goldwasser ed., Springer-Verlag, 1988.

What is claimed is:

1. A masking process comprising:
receiving credential data from a prover;
receiving, on a computer device, at least one set of private keys corresponding to the prover credential data from an enrollment center computer;
hashing the prover credential data by a hash function to generate a hashed result;
dividing the hashed result into a plurality of divided parts, wherein the plurality of divided parts includes at least one part for every private key of the at least one set of private keys;
hashing each part of the plurality of divided parts by the hash function to generate a set of masks; and
transforming the at least one set of private keys to at least one set of device key fragments using the set of masks, wherein transforming the at least one set of private keys to at least one set of device key fragments using the set of masks comprises:
selecting at least one private key from the set of private keys;
selecting a mask from the set of masks, wherein the mask corresponds to the selected at least one private key;
subtracting the corresponding mask from the selected at least one private key to produce at least one device key fragment of the at least one set of device key fragments; and
repeating the said step of selecting at least one private key from the at least one set of private keys to the step of subtracting the corresponding mask from the selected at least one private key to produce the at least one device key fragment until each private key of the at least one set of private keys has a corresponding device key fragment.

2. An unmasking process comprising:
receiving credential data from a prover;
receiving, on a computer device, at least one set of device key fragments for the prover credential data;
hashing the prover credential data by use of a hashing function to generate a hashed result;
dividing the hashed result into a plurality of divided parts, wherein the plurality of divided parts includes at least one part corresponding to each device key fragment of the set of device key fragments;
hashing each part of the plurality of divided parts the hashing function to generate a set of masks;
transforming the set of device key fragments to a plurality of private keys using the set of masks, wherein transforming the set of device key fragments to the plurality of private keys using the set of masks includes:
selecting a device key fragment from the set of device key fragments;
selecting a corresponding mask from the set of masks;
adding the corresponding mask to the selected device key fragment to recreate a private key; and
repeating the step of selecting a device key fragment from the set of device key fragments to the step of adding the corresponding mask to the selected device key fragment to recreate the private key until each device key fragment of the set of device key fragments has a corresponding private key.

3. The process of claim 1, where the step of hashing the plurality of divided parts by the hash function to generate the set of masks comprises:
selecting a part from the plurality of divided parts;
hashing the selected part by the hash function;
identifying the resulting hash as a mask associated with the selected part; and
repeating the step of selecting a part from the plurality of divided parts to the step of identifying the resulting hash as a mask associated with the selected part until each part of the plurality of divided parts is hashed.

4. The process of claim 2, where the step of hashing the plurality of divided parts by the hash function to generate the set of masks comprises:
- selecting a part from the plurality of divided parts;
- hashing the selected part by the hash function;
- identifying the resulting hash as a mask associated with the selected part; and
- repeating the step of selecting a part from the plurality of divided parts to the step of identifying the resulting hash as a mask associated with the selected part until each part of the plurality of divided parts is hashed.

\* \* \* \* \*